(12) United States Patent
Heo et al.

(10) Patent No.: US 10,968,420 B2
(45) Date of Patent: Apr. 6, 2021

(54) BEVERAGE MAKER

(71) Applicant: LG Electronics Inc., Seoul (KR)

(72) Inventors: Jeongik Heo, Seoul (KR); Shic Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 319 days.

(21) Appl. No.: 16/193,769

(22) Filed: Nov. 16, 2018

(65) Prior Publication Data

US 2019/0153369 A1 May 23, 2019

(30) Foreign Application Priority Data

Nov. 17, 2017 (KR) .......................... 10-2017-0154332

(51) Int. Cl.
 *C12C 11/00* (2006.01)
 *C12C 13/10* (2006.01)
 *B67D 1/00* (2006.01)
(52) U.S. Cl.
 CPC .............. *C12C 13/10* (2013.01); *C12C 11/00* (2013.01)
(58) Field of Classification Search
 CPC ........... A47J 31/41; A47J 31/60; C12C 11/00; C12C 11/006; C12C 13/00; C12C 13/10; B08B 9/0321; B08B 9/0325; B08B 9/08; B08B 9/093; B08B 9/00; B08B 9/10; B67D 1/0016; B67D 1/07; B67D 1/0888; B67D 1/0895; B67D 1/1247

USPC ......... 99/275, 276, 277, 278, 288, 293, 294, 99/300, 305, 316
See application file for complete search history.

(56) References Cited

U.S. PATENT DOCUMENTS

| 6,032,571 A * | 3/2000 | Brous ..................... C12C 13/10 366/249 |
| 2016/0318747 A1* | 11/2016 | Peirsman ............. B67D 1/1477 |
| 2016/0326471 A1* | 11/2016 | Aown ..................... C12C 11/00 |
| 2017/0240401 A1* | 8/2017 | Pellaud ................ B67D 1/1284 |
| 2018/0086621 A1* | 3/2018 | Dubief ................. B67D 1/0888 |

* cited by examiner

*Primary Examiner* — Hung D Nguyen
(74) *Attorney, Agent, or Firm* — Fish & Richardson P.C.

(57) ABSTRACT

A beverage maker includes: a water supply module configured to supply water used by the beverage maker; an ingredient supplier connected to the water supply module, the ingredient supplier including a plurality of ingredient holders each of which has an inlet and an outlet; a fermentation module connected to the ingredient supplier and configured to receive ingredients from the ingredient supplier and water from the water supply module; at least one connection channel configured to connect the outlet of a first ingredient holder among the plurality of the ingredient holders to the inlet of a second ingredient holder among the plurality of the ingredient holders; and a support holder located in the ingredient supplier and configured to support the connection channel.

20 Claims, 15 Drawing Sheets

US 10,968,420 B2

BEVERAGE MAKER

CROSS-REFERENCE TO RELATED APPLICATIONS

The present application claims priority under 35 U.S.C. 119 and 35 U.S.C. 365 to Korean Patent Application No. 10-2017-0154332, filed on Nov. 17, 2017, which is hereby incorporated by reference in its entirety.

FIELD

The present disclosure relates to a beverage maker, and more particularly, to a beverage maker for making a fermentation beverage.

BACKGROUND

Beverages are collectively referred to as drinkable liquids such as alcoholic drinks, coffee, soft drinks, juice, milk, or tea. For example, beverages may be divided into various categories such as water (e.g., spring water, sparkling water as a beverage) to quench thirst, juice beverages with unique flavor and taste, refreshing beverages giving refreshing sensation, stimulating beverages with an arousal effect, or alcoholic beverages with an alcohol effect.

Beer is one example of beverages. The beer is an alcoholic beverage that can be produced by making juice of malt sprouting from barley, filtering the juice, adding hop, and fermenting the juice by using the yeast.

Consumers may purchase ready-made beer made and sold by beer makers or house beer (or handmade beer) made by fermenting beer ingredients at home or in a bar.

House beer may be made in a variety of types ready-made products, and may be made according to the consumer's taste.

The ingredients for making beer may include water, malt, hop, yeast, flavoring additives, and the like.

The yeast, which is sometimes called leaven, may be added to malt, ferment the malt, and help to produce alcohol and carbonic acid.

The flavor additives may enhance the taste of beer with flavors such as fruit, syrup, vanilla beans, and the like.

In some examples, making house beer may include three stages, for example, a wort production step, a fermentation step, and an aging step. In some cases, it may take about two to three weeks from the wort production step to the aging step.

In some cases, an optimum temperature may be maintained during the fermentation stage. The user's convenience may be improved if more beer is produced in a simple way.

It is of interest to develop a beverage maker that is capable of easily making house beer in home or in a bar in a safe way.

SUMMARY

This disclosure provides a beverage maker in which a component and a channel are simplified, and the number of water leakage points is minimized.

According to one aspect of the subject matter described in this application, a beverage maker includes: a water supply module configured to supply water used by the beverage maker; an ingredient supplier connected to the water supply module, the ingredient supplier including a plurality of ingredient holders each of which has an inlet and an outlet; a fermentation module connected to the ingredient supplier and configured to receive ingredients from the ingredient supplier and water from the water supply module; at least one connection channel configured to connect the outlet of a first ingredient holder among the plurality of the ingredient holders to the inlet of a second ingredient holder among the plurality of the ingredient holders; and a support holder located in the ingredient supplier and configured to support the connection channel.

Implementations according to this aspect may include one or more of the following features. For example, the plurality of ingredient holders may be spaced apart from each other, where the support holder is located at a position between the first ingredient holder and the second ingredient holder, and extends in a vertical direction. In some implementations, the inlet and the outlet of each ingredient holder protrude from the ingredient holder in a same direction. In some implementations, the connection channel includes: an outlet fitting configured to couple to the outlet of the first ingredient holder; an inlet fitting configured to couple to the inlet of the second ingredient holder; and a hose part that connects the outlet fitting to the inlet fitting, where the support holder is configured to support at least one of the outlet fitting, the inlet fitting, or the hose part.

In some implementations, the ingredient supplier includes: an ingredient accommodating body that includes the plurality of ingredient holders and the support holder; and a lid module configured to open and close at least a portion of the plurality of ingredient holders. In some examples, the support holder includes: a support part configured to support a lower portion of the connection channel; and a pair of extension parts that extend from each of both ends of the support part and that are configured to couple to the ingredient accommodating body.

In some implementations, each of the pair of extension parts includes a hook part located at an end of each of the pair of extension parts, and the ingredient accommodating body includes a hook catching part configured to couple to the hook part. In some examples, a distance between the pair of extension parts at the ingredient accommodating body is greater than a distance between the pair of extension parts at the lower portion of the connection channel.

In some implementations, the inlets and the outlets of the plurality of ingredient holders are arranged along a straight line that passes through the plurality of ingredient holders. In some examples, the inlets and the outlets of the plurality of ingredient holders are alternately disposed along the straight line.

In some implementations, the outlets of the plurality of ingredient holders are arranged along a first straight line that passes through the plurality of ingredient holders, and the inlets of the plurality of ingredient holders are arranged along a second straight line that is parallel to the first straight line and that passes through the plurality of ingredient holders. In some examples, the ingredient supplier further includes a guide plate that is located at an outer bottom surface of each ingredient holder and that extends in a direction parallel to a longitudinal direction of the hose part of the connection channel.

In some implementations, the guide plate is located between the inlet and outlet of each ingredient holder. In some examples, at least a portion of the guide plate is disposed between the inlet of the first ingredient holder and the inlet of the second ingredient holder.

In some implementations, the beverage maker further includes: a main channel that connects the water supply module to the ingredient supplier; and an ingredient supply valve configured to open and close at least a portion of the main channel, where the ingredient supplier defines an ingredient supply valve mounting part configured to mount the ingredient supply valve.

According to another aspect, a beverage maker includes: a water supply module configured to supply water used by the beverage maker; an ingredient supplier connected to the water supply module through a first main channel, where the ingredient supplier includes a plurality of ingredient holders, each of which has an inlet and an outlet; and a fermentation module connected to the ingredient supplier through a second main channel and configured to receive ingredients from the ingredient supplier and water from the water supply module. The plurality of ingredient holders are connected in series to each other to enable fluid to pass through the plurality of ingredient holders in series.

Implementations according to this aspect may include one or more of the following features. For example, the beverage maker further includes one or more connection channels configured to connect the outlet of one ingredient holder to the inlet of anther ingredient holder among the plurality of the ingredient holders. The plurality of ingredient holders may include: an initial ingredient holder having an initial inlet connected to the first main channel; a final ingredient holder having a final outlet connected to the second main channel; and at least one intermediate ingredient holder disposed between the initial ingredient holder and the final ingredient holder, the intermediate ingredient holder having an inlet and an outlet that are connected to different connection channels among the one or more connection channels.

In some implementations, the beverage maker further includes a support holder configured to support the one or more connection channels. In some examples, the ingredient supplier includes, an ingredient accommodating body that includes the plurality of ingredient holders and the support holder, and a lid module configured to open and close at least a portion of the plurality of ingredient holders.

In some implementations, the inlet of one ingredient holder is configured to receive fluid from the outlet of another ingredient holder. In some implementations, the plurality of ingredient holders are located vertically above the one or more connection channels.

The details of one or more implementations are set forth in the accompanying drawings and the description below. Other features will be apparent from the description and drawings, and from the claims.

DETAILED DESCRIPTION

Hereinafter, detailed implementations of the present disclosure will be described in detail with reference to the accompanying drawings.

Although beer is exemplified as a beverage made by a beverage maker in this specification, a kind of beverages include, but is not limited to, beer that is capable of being made by the beverage maker. For example, various kinds of beverages may be made through the beverage maker according to some implementations.

Figure 1:
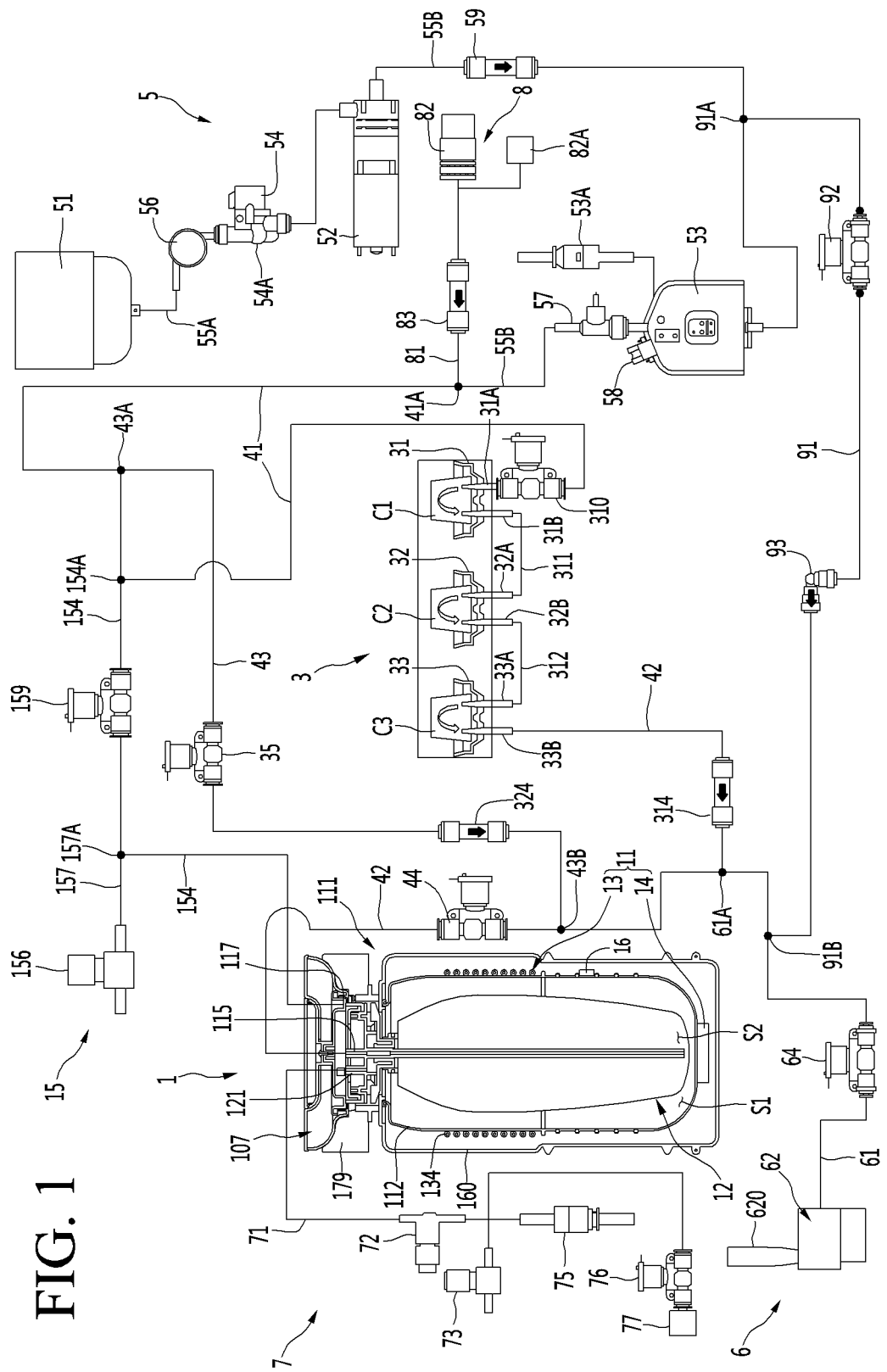
FIG. 1 is a view illustrating an example configuration of an example beverage maker.

FIG. 1 is a view illustrating an example configuration of an example beverage maker according to a first implementation.

A beverage maker may include a fermentation module 1. A beverage may be fermented in the fermentation module 1.

The beverage maker may include a temperature controller that controls an inner temperature of the fermentation module 1.

The beverage maker may include a water supply module 5. The water supply module 5 may supply water.

The beverage maker may include ingredient supplier 3 provided with ingredient holders 31, 32, and 33 in which ingredients required for making the beverage are accommodated.

The beverage maker may include main channels 41 and 42 connecting the water supply module 5 to the fermentation module 1.

The beverage maker may include a beverage dispenser 6 for dispensing the beverage made in the fermentation module 1 to the outside.

The beverage dispenser 6 may be connected to a second main channel 42. Thus, the beverage dispensed from the fermentation module 1 may be guided to the beverage dispenser 6 by passing through a portion of the second main channel 42.

The beverage maker may further include a gas discharger 7. The gas discharger 7 may be connected to the fermentation module 1 to discharge a gas generated while the beverage is made.

The beverage maker may further include an air injector for injecting air. The air injector 8 may be connected to the water supply module 5 or a first main channel 41. The air injector may include an air pump 82.

The beverage maker may further include an air controller 15 controlling a pressure between an inner wall of a fermentation tank 112 and an outer surface of a fermentation container 12.

The beverage maker may further include a sub channel 91. The sub channel 91 may connect the water supply module 5 to the beverage dispenser 6.

Hereinafter, the fermentation module 1 will be described in detail.

The fermentation module 1 may include a fermentation module 111 having an opening 170 and fermentation lid 107 opening and closing the opening 170.

The fermentation module 111 may include a fermentation case 160 and a fermentation tank 112 accommodated in the fermentation case 160 and having an inner space S1. The insulation part may be provided between the fermentation case 160 and the fermentation tank 112. The fermentation module 111 may further include a lid seating body 179 on which the fermentation lid 107 is seated.

Each of the fermentation case 160 and the fermentation tank 112 may be provided as an assembly of a plurality of members. The fermentation case 160 may define an outer appearance of the fermentation module 111.

The fermentation lid 107 may seal the inside of the fermentation module 111 and be disposed on the fermentation module 111 to cover the opening. A main channel, particularly, a main channel connecting portion 115 connected to a second main channel 42 may be provided in the fermentation lid 107.

A fermentation container 12 may be accommodated in the fermentation tank 112.

The fermentation container 12 may be provided as a separate container so that the beverage ingredients and the made beverage stain an inner wall of the fermentation tank 112. The fermentation container 12 may be separably disposed on the fermentation tank 112. The fermentation container 12 may be seated on the fermentation tank 112 to ferment the beverage within the fermentation tank 112. After the fermentation container 12 is used, the fermentation container 12 may be withdrawn to the outside of the fermentation tank 112.

The fermentation container 12 may be a pack containing the ingredients for making the beverage. The fermentation container 12 may be made of a flexible material. Thus, the fermentation container 12 may be easily inserted into the fermentation tank 112 and be contracted and expanded by a pressure. However, this implementation is not limited thereto. For example, the fermentation container 12 may be made of a pet material.

The fermentation container 12 may have a beverage making space S2 in which the beverage ingredients are accommodated, and the beverage is made. The fermentation container 12 may have a size less than that of the inner space S1 of the fermentation tank 112.

The fermentation container 12 may be inserted and accommodated into the fermentation tank 112 in the state in which the ingredients are contained in the fermentation container 12. The fermentation container 12 may be inserted into the fermentation tank 112 and then accommodated in the fermentation tank 112 in the state in which the fermentation lid 107 is opened.

The fermentation lid 107 may seal the fermentation tank 112 after the fermentation container 12 is inserted into the fermentation tank 112. The fermentation container 12 may assist the fermentation of the ingredient in the state in which the fermentation container 12 is accommodated in the space S1 that is sealed by the fermentation container 12 and the fermentation lid 107. The fermentation container 12 may be expanded by the pressure therein during the making of the beverage. The fermentation container 12 may be pressed by the air within the fermentation tank 112 when the beverage contained in the fermentation container 12 is dispensed, and the air is supplied between an inner surface of the fermentation tank 112 and the fermentation container 12.

The fermentation tank 112 may be disposed in the fermentation case 160. The fermentation tank 112 may have an outer circumference surface and a bottom surface, which are spaced apart from the inner surface of the fermentation case 160. In more detail, the outer circumference the fermentation tank 112 may be spaced apart from an inner circumference of the fermentation case 160, and an outer bottom surface of the fermentation tank 112 may be spaced apart from an inner bottom surface of the fermentation case 160.

The insulation part may be provided between the fermentation case 160 and the fermentation tank 112. The insulation part may be disposed in the fermentation case 160 to surround the fermentation tank 112. Thus, the fermentation tank 112 may be constantly maintained in temperature.

The insulation part may be made of a material such as foamed polystyrene or polyurethane which has high thermal insulating performance and absorbs vibration.

The fermentation tank 112 may include a temperature sensor 16 for measuring the temperature of the fermentation tank 112.

The temperature sensor 16 may be mounted on a circumferential surface of the fermentation tank 112. The temperature sensor 16 may be disposed below an evaporator 134 wound around the fermentation tank 112.

Hereinafter, the temperature controller 11 will be described in detail.

The temperature controller 11 may change an inner temperature of the fermentation module 111. In more detail, the temperature controller 11 may change a temperature of the fermentation tank 112.

The temperature controller 11 may heat or cool the fermentation tank 112 to control a temperature of the fermentation tank 112 at an optimal temperature for fermenting the beverage.

The temperature controller 11 may include at least one of a refrigerant cycle device 13 or a heater 14. However, this implementation is not limited thereto. For example, the temperature controller 11 may include a thermo-element TEM.

The refrigerant cycle device 13 may control the fermentation tank 112 to adjust a temperature of the fermentation tank 112. The refrigerant cycle device 13 may include a compressor, a condenser, an expansion mechanism, and an evaporator 134.

The evaporator 134 may be disposed to contact an outer surface of the fermentation tank 112. The evaporator 134 may be provided as an evaporation tube wound around an outer surface of the fermentation tank 112. The evaporator 134 may be accommodated between the fermentation tank 112 and the insulation part to cool the fermentation tank 112 that is insulated by the insulation part.

The temperature controller 11 may further include a heater 14 heating the fermentation tank 112. The heater 14 may be installed to contact the bottom surface of the fermentation tank 112. The heater 14 may be provided as a heat generation heater that generates heat when power is applied. The heater 14 may be provided as a plate heater.

Thus, the natural convection of a fluid may be generated inside the fermentation tank 112 by the evaporator 134 and the heater 14, and temperature distribution inside the fermentation tank 112 and the fermentation container 12 may be uniform.

Hereinafter, the main channels 41 and 42 and a bypass channel 43 will be described.

As described above, the main channels 41 and 42 may include a first main channel 41 connecting the water supply module 5 to the ingredient supplier 3 and a second main channel connecting the ingredient supplier 3 to the fermentation module 1.

That is, the first main channel 41 may guide water supplied from the water supply module 5 to the ingredient supplier 3, and the second main channel 42 may guide the mixture of the ingredients and the water, which are dispensed from the ingredient supplier 3, to the fermentation module 1.

The first main channel 41 may have one end connected to the water supply module 5 and the other end connected to the ingredient supplier 3, more particularly, an inlet of an initial ingredient holder 31, which will be described below in more detail.

An ingredient supply valve 310 opening and closing the first main channel 41 may be installed in the first main channel 41. The ingredient supply valve 310 may be provided in the ingredient supplier 3.

The ingredient supply valve 310 may be opened when additives accommodated in the ingredient holders 31, 32, and 33 are put to open the first main channel 41. The ingredient supply valve 310 may be opened when the ingredient holders 31, 32, and 33 are cleaned to open the first main channel 41.

The second main channel 42 may have one end connected to a main channel connecting portion 115 of the fermentation module 1 and the other end connected to the ingredient supplier 3, more particularly, an outlet 33B of a final ingredient holder 33, which will be described below in more detail.

A main valve 44 opening and closing the second main channel 42 may be installed in the second main channel 42. Also, a main check valve 314 for allowing the fluid to flow from the ingredient supplier 3 to the fermentation module 1 may be installed in the second main channel 42. That is, the main check valve 314 may prevent the fluid from flowing back to the ingredient supplier 3.

The main check valve 314 may be disposed between the main valve 44 and the ingredient supplier 3 with respect to the second main channel 42.

The main valve 44 may be opened when the water is supplied to the fermentation container 12 to open the second main channel 42. The main valve 44 may be closed while the fermentation tank 112 is cooled to close the second main channel 42. The main valve 44 may be opened when the air is injected into the fermentation container 12 to open the second main channel 42. The main valve 44 may be opened when the additives are supplied into the fermentation container 12 to open the second main channel 42. The main valve 44 may be closed to seal the inside of the fermentation container 12 during the fermentation of the ingredients. The main valve 44 may be closed to seal the inside of the fermentation container 12 when the beverage is aged and stored. The main valve 44 may be opened when the beverage is dispensed by the beverage dispenser 6 to open the second main channel 4. The beverage within the fermentation container 12 may pass through the main valve 44 to flow to the beverage dispenser 6.

The main channels 41 and 42 may be provided as one continuous channel when the beverage maker does not include the ingredient supplier 3.

When the beverage maker includes the ingredient supplier 3, the beverage maker may further include a bypass channel 43 configured to allow the water or the air to bypass the ingredient holders 31 and 32.

The bypass channel 43 may bypass the ingredient holders 31, 32, and 33 and then be connected to the first main channel 41 and the second main channel 42.

The bypass channel 43 may have one end connected to the first main channel 41 and the other end connected to the second main channel 42. In more detail, the bypass channel 43 may have one end 43A connected to the first main channel 41 between the water supply module 5 and the ingredient supply valve 310 and the other end 43B connected to the second main channel 42 between the main valve 44 and the ingredient supplier 3.

A bypass valve 35 opening and closing the bypass channel 43 may be installed in the bypass channel 43.

The bypass valve 35 may be opened when the water supplied from the water supply module 5 is supplied to the fermentation container 12 to open the bypass channel 43. The bypass valve 35 may be opened when the air injected from the air injector 8 is supplied to the fermentation container 12 to open the bypass channel 43. The bypass valve 35 may be opened when the bypass channel 43 is cleaned to open the bypass channel 43.

Also, a bypass check valve 324 allowing the fluid to flow from the first main channel 41 to the second main channel 42 may be installed in the bypass channel 43. That is, the fluid may flow only from the first main channel 41 to the second main channel 42 but may not flow in the opposite direction.

The bypass check valve 324 may be disposed between the bypass valve 35 and the second main channel 42 with respect to the bypass channel 43.

Hereinafter, the ingredient supplier 3 will be described in detail.

When beer is made by using the beverage maker, the ingredients for making the beer may include water, malt, yeast, hop, flavoring additives, and the like.

In some implementations, the beverage maker may include one or more of the ingredient supplier 3 and the fermentation container 12. The ingredients for making the beverage may be accommodated to be divided into the ingredient supplier and fermentation container 12. A portion of the ingredients for making the beverage may be accommodated in the fermentation container 12, and the remaining ingredients may be accommodated in the ingredient supplier 3. The remaining ingredients accommodated in the ingredient supplier 3 may be supplied to the fermentation container 12 together with the water supplied from the water supply module 5 and mixed with the portion of the ingredients accommodated in the fermentation container 12.

A main ingredient that is essential for making the beverage may be accommodated in the fermentation container 12, and the additives added to the main ingredient may be accommodated in the ingredient supplier 3. In this case, the additives accommodated in the ingredient supplier 3 may be mixed with the water supplied from the water supply module 5 and supplied to the fermentation container 12 and then be mixed with the main ingredient accommodated in the fermentation container 12.

The main ingredient accommodated in the fermentation container 12 may have a capacity greater than that of other ingredients. For example, when the beer is made, the main material may be the malt of the malt, the yeast, the hop, and the flavoring additives. Also, the additive accommodated in the ingredient supplier 3 may be the other ingredient except for the malt of the ingredient for making the beer, for example, the yeast, the hop, and the flavoring additives.

The beverage maker may not include the ingredient supplier 3 but include the fermentation container 12. In this case, the main ingredient may be accommodated in the fermentation container 12, and the user may directly put the additives into the fermentation container 12.

In some cases where the beverage maker includes all the ingredient supplier 3 and the fermentation container 12, the beverage may be made more easily. Hereinafter, the case in which the beverage maker includes all of the ingredient supplier 3 and the fermentation container, will be described as an example. However, this implementation is not limited to the case in which the beverage maker includes all of the ingredient supplier 3 and the fermentation container 12.

The ingredients within the fermentation container 12 may be fermented as time elapses, and the beverage made in the fermentation container 12 may flow to the second main channel 42 through the main channel connecting portion 115 and also flow from the second main channel 42 to the beverage dispenser 6 so as to be dispensed.

The ingredients that are necessary for making the beverage may be accommodated in the ingredient supplier 3, and the water supplied from the water supply module 5 may pass through ingredient supplier 3. For example, when the beverage made in the beverage maker is beer, the ingredient accommodated in the ingredient supplier 3 may be yeast, hop, flavoring additives, and the like.

The ingredient accommodated in the ingredient supplier 3 may be directly accommodated into an ingredient holders 31, 32, and 33 provided in the ingredient supplier 3. At least one ingredient holder 31, 32, and 33 may be provided in the ingredient supplier 3. The plurality of ingredient holders 31, 32, and 33 may be provided in the ingredient supplier. In this case, the ingredient holders 31, 32, and 33 may be partitioned with respect to each other.

Inlets 31A, 32A, and 33A through which the fluid is introduced and outlets 31B, 32B, and 33B through which the fluid is discharged may be provided in the ingredient holders 31, 32, and 33, respectively. The fluid introduced into the inlet of one ingredient holder may be mixed with the ingredients within the ingredient holders and then discharged through the outlet.

The ingredients accommodated in the ingredient supplier 3 may be accommodated in capsules C1, C2, and C3. In this case, the capsules C1, C2, and C3 may be accommodated in the ingredient holders 31, 32, and 33, and each of the ingredient holders 31, 32, and 33 may be called a capsule mounting part.

When the ingredients are accommodated in the capsules C1, C2, and C3, the ingredient supplier 3 may be configured so that the capsules C1, C2, and C3 are seated and withdrawn. The ingredient supplier may be provided as a capsule kit assembly in which the capsules C1, C2, and C3 are separably accommodated.

For example, a first additive, a second additive, and a third additive may be accommodated in the ingredient supplier 3. The first additive may be yeast, the second additive may be hop, and the third additive may be a flavoring additive. The ingredient supplier 3 may include a first capsule mounting part 31 in which a first capsule C1 containing the first additive is accommodated, a second capsule mounting part 32 in which a second capsule C2 containing the second additive is accommodated, and a third capsule mounting part 33 in which a third capsule C3 containing the third additive is accommodated.

The ingredients contained in the ingredient holder or the capsules C1, C2, and C3 may be extracted by a water pressure of the water supplied from the water supply module 5.

When the ingredients are extracted by the water pressure, the water supplied from the water supply module 5 to the first main channel 41 may pass through the ingredient holder or the capsules C1, C2, and C3 and then be mixed with the ingredients, and the ingredients accommodated in the ingredient holder or the capsules C1, C2, and C3 may flow to the second main channel together with the water.

A plurality of additives different from each other may be accommodated to be divided in the ingredient supplier 3. For example, when the beer is made, the plurality of additives accommodated in the ingredient supplier 3 may be the yeast, the hop, and the flavoring additive, which are accommodated to be divided from each other.

When the plurality of ingredient holders are provided in the ingredient supplier 3, the plurality of ingredient holders 31, 32, and 33 may be connected in series to each other in a flow direction of the water.

In more detail, the ingredient supplier 3 may include at least one connection channel 311 and 312 connecting the outlet of one ingredient holder of the plurality of ingredient holders 31, 32, and 33 to the inlet of the other ingredient holder.

Also, the plurality of ingredient holders 31, 32, and may include an initial ingredient holder 31 and a final ingredient holder 33. The plurality of ingredient holders 31, 32, and 333 may further include an intermediate ingredient holder 32.

The inlet 31A of the initial ingredient holder 31 may be connected to the first main channel 41, and the outlet 33B of the final ingredient holder 33 may be connected to the second main channel 42.

The intermediate ingredient holder 32 may be disposed between the first ingredient holder 31 and the third ingredient holder 33 in the flow direction of the fluid. The inlet 32A and the outlet 32B of the intermediate ingredient holder 32 may be connected to the connection channels 311 and 312 different from each other.

As illustrated in FIG. 1, when three ingredient holders are provided in the ingredient supplier 3, the outlet 31B of the final ingredient holder 31 may be connected to the inlet 32A of the intermediate ingredient holder 32 through the first connection channel 311, and the outlet 32B of the intermediate ingredient holder 32 may be connected to the inlet 33A of the final ingredient holder 33 through the second connection channel 312.

In this case, the water introduced into the inlet 31A of the final ingredient holder 31 through the first main channel may flow to the first connection channel 311 through the outlet 31B together with the first additive accommodated in the initial ingredient holder 31.

The fluid (the mixture of the water and the first additive) introduced into the inlet 32A of the intermediate ingredient holder 32 through the first connection channel 311 may flow to the second connection channel 312 through the outlet 32B together with the second additive accommodated in the intermediate ingredient holder 32.

The fluid (the mixture of the water and the first and second additives) introduced into the inlet 33A of the final ingredient holder 33 through the second connection channel 312 may flow to the second connection channel 312 through the outlet 33B together with the third additive accommodated in the final ingredient holder 33.

The fluid (the mixture of the water and the first, second, and third additives) discharged through the second main channel 42 may be guided to the main channel connecting portion 115 of the fermentation module 1 and then introduced into the fermentation container 12.

However, the configuration of the ingredient supplier is not limited thereto. For example, when the intermediate ingredient holder is not provided, two ingredient holders may be provided in the ingredient supplier 3. In this case, one ingredient holder may be the initial ingredient holder, and the other ingredient holder may be the final ingredient holder. The outlet of the initial ingredient holder and the inlet of the final ingredient holder may be connected to each other by the connection channel.

For another example, when the intermediate ingredient holder is provided in plurality, four or more ingredient holders may be provided in the ingredient supplier 3. In this case, one ingredient holder may be the initial ingredient holder, the other ingredient holder may be the final ingredient holder, and the remaining ingredient holder may be the intermediate ingredient holder. In this case, since the connection between the ingredient holders in series is easily understood by the person skilled in the art, their detailed descriptions will be omitted.

Since the plurality of ingredient holders 31, 32, and 33 are connected in series to each other, the channel configuration of the ingredient supplier 3 may be simplified. Also, since the additives contained in the capsules C1, C2, and C3 are extracted at once, a time taken to extract the additives may decrease. Also, since the user does not have to worry about the mounting order of the capsules C1, C2, and C3, malfunction due to the mounting of the capsules C1, C2, and C3 in erroneous order may not occur. Also, the ingredient supplier 3 may be minimized in water leakage point to improve reliability.

When the ingredients accommodated in the ingredient supplier 3 are accommodated in the capsules C1, C2, and C3, the initial ingredient holder 31 may be called an initial capsule mounting part, the intermediate ingredient holder 32 may be called an intermediate capsule mounting part, and the final ingredient holder 33 may be a final capsule mounting part.

Hereinafter, the water supply module 5 will be described in detail.

The water supply module 5 may include a water tank 51, a water supply pump 52 for pumping water within the water tank 51, and a water supply heater 53 for heating the water pumped by the water supply pump 52.

The water supply module 5 may further include the water supply pump 52 for pumping water within the water tank 51 and the water supply heater 53 for heating the water pumped by the water supply pump 52.

The water tank 51 and the water supply pump 52 may be connected to a water tank discharge channel 55A, and the water contained in the water tank 51 may be introduced into the water supply pump 52 through the water tank discharge channel 55A.

The water supply pump 52 and one end of the first main channel 41 may be connected to a water supply channel 55B, and the water discharged from the water supply pump may be guided to the first main channel 41 through the water supply channel 55B.

A flow meter 56 for measuring a flow rate of the water discharged from the water tank 51 may be installed in the water tank discharge channel 55A.

Also, a flow rate control valve 54 for controlling the flow rate of the water discharged from the water tank 51 may be installed in the water tank discharge channel 55A. The flow rate control valve 54 may include a step-in motor.

Also, a thermistor 54A for measuring a temperature of the water discharged from the water tank 51 may be installed in the water tank discharge channel 55A. The thermistor 54A may be built in the flow rate control valve 54.

A water supply check valve 59 for preventing the water from flow back to the water supply pump 52 may be installed in the water supply channel 55B.

The water supply heater 53 may be installed in the water supply channel 55B.

The water supply heater 53 may be a mold heater and include a heater case through which the water pumped by the water supply pump 52 passes and a heat generation heater installed in the heater case to heat the water introduced into the heater case.

A thermal fuse 58 for interrupting a circuit to cutoff current applied to the water supply heater 53 when a temperature is high may be installed in the water supply heater 53.

The water supply module 5 may further include a safety valve 53A. The safety valve 53A may communicate with the inside of the heater case of the water supply heater 53. The safety valve 53A may restrict a maximum inner pressure of the heater case. For example, the safety valve 53A may restrict the maximum inner pressure of the heater case to a pressure of about 3.0 bar.

The water supply module 5 may further include a water supply temperature sensor 57 for measuring a temperature of the water passing through the water supply heater 53. The water supply temperature sensor 57 may be installed in the water supply heater 53. Alternatively, the water supply temperature sensor 57 may be disposed at a portion of the water supply channel 55B behind the water supply heater 53 in the flow direction of the water. Also, the water supply temperature sensor 57 may be installed in the first main channel 41.

When the water supply pump 52 is driven, the water within the water tank 51 may be introduced into the water supply pump 52 through the water tank discharge channel 55A, and the water discharged from the water supply pump 52 may be heated in the water supply heater 53 while flowing through the water supply channel 55B and then be guided to the first main channel 41.

Hereinafter, the beverage dispenser 6 will be described.

The beverage dispenser 6 may be connected to the second main channel 42.

In more detail, the beverage dispenser 6 may include a dispenser 62 for dispensing the beverage and a beverage dispensing channel 61 connecting to the dispenser 62 to the second main channel 42.

The beverage dispensing channel 61 may have one end (e.g., the connecting portion 61A) connected between the main check valve 314 and the main valve 44 with respect to the second main channel 42, and the other end connected to the dispenser 62.

A beverage dispensing valve 64 opening and closing the beverage dispensing channel 61 may be installed in the beverage dispensing channel 61.

The beverage dispensing valve 64 may be opened when the beverage is dispensed to open the beverage dispensing channel 61. The beverage dispensing valve 64 may be opened when residual water is removed to open the beverage dispensing channel 61. The beverage dispensing valve 64 may be opened when the beverage dispenser is cleaned to open the beverage dispensing channel 61.

An anti-foaming part may be provided in the beverage dispensing channel 61, and an amount of foam of the beverage flowing from the second main channel 42 to the beverage dispensing channel 61 may be minimized while passing through the anti-foaming part. A mesh for filtering the foam may be provided in the anti-foaming part 63.

When the beverage is dispensed, the beverage dispensing valve 64 may be opened. When the beverage is not dispensed, the closed state of the beverage dispensing valve 64 may be maintained.

Hereinafter, the gas discharger 7 will be described in detail.

The gas discharger 7 may be connected to the fermentation module 1 to discharge a gas generated in the fermentation container 12.

In more detail, the gas discharger 7 may include a gas discharge channel 71 connected to the fermentation module, a gas pressure sensor 72 installed in the gas discharge channel 71, and a gas discharge valve 73 connected behind the gas pressure sensor 72 in the gas discharge channel 71 in the gas discharge direction.

The gas discharge channel 71 may be connected to the fermentation module 1, particularly, the fermentation lid 107. A gas discharge channel connecting portion 121 to which the gas discharge channel 71 is connected may be provided in the fermentation lid 107.

The gas within the fermentation container 12 may flow into the gas discharge channel 71 and the gas pressure sensor 72 through the gas discharge channel connecting portion 121. The gas pressure sensor 72 may detect a pressure of the gas discharged to the gas discharge channel 71 through the gas discharge channel connecting portion 121 within the fermentation container 12.

The gas discharge valve 73 may be turned to be opened when the air is injected into the fermentation container 12 by the air injector 8. The beverage maker may uniformly mix the malt with the water by injecting the air into the fermentation container 12. Here, foam generated in the liquid malt may be discharged from the upper portion of the fermentation container 12 to the outside through the gas discharge channel 71 and the gas discharge valve 73.

The gas discharge valve 73 may be turned on to detect fermentation during the fermentation process and then tuned off to be closed.

The gas discharger 7 may further include the safety valve 75 connected to the gas discharge channel 71. The safety valve 75 may be connected behind the gas pressure sensor 72 in the gas discharge channel 71 in the gas discharge direction. The safety valve 75 may restrict a maximum pressure of the fermentation container 12 and the gas discharge channel 71. For example, the safety valve 75 may restrict the maximum pressure of the fermentation container 12 and the gas discharge channel 71 to a pressure of about 3.0 bar.

The gas discharger 7 may further include a pressure release valve 76.

The pressure release valve 76 may be connected to the gas discharge channel 71. The pressure release valve 76 and the gas discharge valve 73 may be selectively opened/closed.

The gas discharge channel 71 may be branched to be respectively connected to the gas discharge valve 73 and the pressure release valve 76.

A noise reducing device 77 may be mounted on the pressure release valve 76. The noise reducing device 77 may include at least one of an orifice structure or a muffler structure.

Even though the pressure release valve 76 is opened, an inner pressure of the fermentation container 12 may gradually decrease by the noise reducing device 77.

When the fermentation of the beverage progresses, the pressure release valve 76 may be opened to release the pressure in the state in which the inner pressure of the fermentation container 12 increases. The noise reducing device 77 may effectively reduce noise generated due to a difference in pressure of the inside and outside of the fermentation container 12.

The pressure release valve 76 may be controlled to be opened/closed in a secondary fermentation process (S800) that will be described below.

Hereinafter, the air injector 8 will be described.

The air injector 8 may be connected to the water supply channel 55B or the first main channel 41 to inject air. Hereinafter, for convenience of description, the case in which the air injector 8 is connected to the water supply channel 55B will be described as an example.

The air injector 8 may be connected to an opposite side of a sub channel 91, which will be described later, with respect to the water supply heater 53.

In this case, the air injected into the air injector 8 may pass through the water supply heater 53 to flow to the sub channel 91 together with the residual water within the water supply heater 53. Thus, the residual water within the water supply heater 53 may be removed to maintain a clean state of the water supply heater 53.

Alternatively, the air injected from the air injector 8 to the first main channel 41 may successively pass through the bypass channel 43 and the second main channel 42 and then be injected into the fermentation container 12. Thus, stirring or aeration may be performed in the fermentation container 12.

Alternatively, the air injected from the air injector 8 to the first main channel 41 may be guided to the ingredient supplier 3 to flow to the capsule mounting parts 31, 32, and 33. The residual water or residues within the capsules C1, C2, and C3 or the capsule mounting parts 31, 32, and 33 may flow the second main channel 42 by the air injected by the air injector 8. The capsules C1, C2, and C3 and the capsule mounting parts 31, 32, and 33 may be cleanly maintained by the air injected by the air injector 8.

The air injector 8 may include an air injection channel connected to the water supply channel 55B or the first main channel 41 and an air pump 82 connected to the air injection channel 81. The air pump 82 may pump the air to the air injection channel 81.

An air injection check valve 83 preventing the water flowing to the water supply channel 55B by the water supply pump from being introduced into the air pump 82 through the air injection channel 81 may be installed in the air injection channel 81.

The air injector 8 may further include an air filter 82A. The air filter 82A may be provided in a suction part of the air pump 82, and thus, external air may be suctioned into the air pump 82 by passing through the air filter 82A. Thus, the air pump 82 may inject clean air into the air injection channel 81.

Hereinafter, the air controller 15 will be described in detail.

The air controller 15 may control a pressure between an inner wall of the fermentation tank 112 and an outer surface of the fermentation container 12.

The air controller 15 may supply air into a space between the fermentation container 12 and the fermentation tank 112. On the other hand, the air controller 15 may exhaust the air within the space between the fermentation container 12 and the fermentation tank 112 to the outside.

The air controller 15 may include an air supply channel 154 connected to the fermentation module 1 and an exhaust channel 157 connected to the air supply channel 154 to exhaust the air to the outside.

The air supply channel 154 may have one end connected to the first main channel 41 and the other end connected to the fermentation module 1.

The air supply channel 154 may be connected to the fermentation module 1, particularly, the fermentation lid 107. An air supply channel connecting portion 117 to which the air supply channel 154 is connected may be provided in the fermentation module 1. The air supply channel connecting portion 117 may communicate with the space between the inner wall of the fermentation tank 112 and the outer surface of the fermentation container 12.

The air injected from the air injector 8 to the first main channel 41 may be guided between the outer surface of the fermentation container 12 and the inner wall of the fermentation tank 112 through the air supply channel 154.

The air injector 8 may function as an air supplier for supplying the air into the space between the fermentation container 12 and the fermentation tank 112 together with the air supply channel 154.

As described above, the air supplied into the fermentation tank 112 may press the fermentation container 12 between the outer surface of the fermentation container 12 and the inner wall of the fermentation tank 112.

The beverage within the fermentation container 12 may be pressed by the fermentation container 12 that is pushed by the air. When the main valve 44 and the beverage dispensing valve 64 are opened, the beverage may pass through the main channel connecting portion 115 to flow the second main channel 42. The beverage flowing from the fermentation container 12 to the second main channel 42 may be dispensed to the outside through the beverage dispenser 6.

The air pump 82 may supply air so that a predetermined pressure occurs between the fermentation container 12 and the fermentation tank 112. Thus, a pressure at which the beverage within the fermentation container 12 is easily dispensed may be occur between the fermentation container 12 and the fermentation tank 112.

The air pump 82 may be maintained in the turn-off state while the beverage is dispensed. When the beverage is completely dispensed, the air pump 82 may be driven for next beverage dispensing and then stopped.

Thus, when the beverage is completely made, the beverage maker may dispense the beverage within the fermentation container 12 to the beverage dispenser 6 in the state in which the fermentation container 12 is disposed within the fermentation module 1 without withdrawing the fermentation container 12 to the outside of the fermentation module 1.

The air controller 15 may include a separate air supply pump with respect to the air injector 8. In this case, the air supply channel 154 may be connected to the air supply pump, but may not connected to the first main channel 41. However, the injection of the air into the fermentation container 12 by the air pump 82 and the supplying of the air into the space between the fermentation container 12 and the fermentation tank 112 may be combined with each other to realize a compact product and reduce a manufacturing cost.

The exhaust channel 157 may function as an air exhaust passage, through which the air between the fermentation container and the fermentation tank 112 is exhausted to the outside, together with a portion of the air supply channel 154.

The exhaust channel 157 may be disposed outside the fermentation module 1. The exhaust channel 157 may be connected to a portion of the air supply channel 154, which is disposed outside the fermentation tank 112.

The air supply channel 154 may include a first channel connected between a connecting portion 157A connected to the first main channel 41 and the exhaust channel 157 and a second channel connected between the connecting portion 154A connected to the exhaust channel 157 and the air supply channel connecting portion 117. The first channel may be an air supply channel for guiding the air pumped by the air pump 82 to the second channel. Also, the second channel may be an air supply and exhaust-combined channel for supplying the air passing through the air supply channel into the space between the fermentation tank 112 and the fermentation container 12 or guiding the air discharged from the space between the fermentation tank 112 and the fermentation container 12 to the connecting portion 157A.

The exhaust channel 157 may be connected to the exhaust valve 156 for opening and closing the exhaust channel 157.

The exhaust valve 156 may be opened so that the air between the fermentation container 12 and the fermentation tank 112 is exhausted to the outside when the fermentation container 12 is expanded while the beverage is made. The exhaust valve 156 may be controlled to be opened when the water is supplied by the water supply module 5. The exhaust valve 156 may be controlled to be opened when the air is injected by the air injection channel 81.

The exhaust valve 156 may be opened so that the air between the fermentation container 12 and the fermentation tank 112 is exhausted when the beverage within the fermentation container 12 is completely dispensed. The user may take the fermentation container out of the fermentation tank 112 when the beverage is completely dispensed. This is done because safety accidents occur when the inside of the fermentation tank 112 is maintained at a high pressure. The exhaust valve 156 may be controlled to be opened when the beverage within the fermentation container 12 is completely dispensed.

The air controller 15 may further include an air supply valve 159 that restricts the air pumped by the air pump 82 and supplied between the fermentation container 12 and the fermentation tank 112.

The air supply valve 159 may be installed in the air supply channel 154. In more detail, the air supply valve 159 may be installed between the connecting portion 154A of the first main channel 41 and the connecting portion 157A of the exhaust channel 157 in the air supply channel 154.

Hereinafter, the sub channel 91 will be described in detail.

The sub channel 91 may connect the water supply module 5 to the beverage dispenser 6. In more detail, the sub channel 91 may have one end 91A connected to the water supply channel 55B and the other end 91B connected to the beverage dispensing channel 61.

The sub channel 91 may be connected between the water supply pump 52 and the water supply heater 53 with respect to the water supply channel 55B.

Also, the sub channel 91 may be connected to the connecting portion 61A of the second main channel 42 and the beverage dispensing valve 64 with respect to the beverage dispensing channel 61.

The water supplied by the water supply pump 52 and the air pumped by the air pump 82 may be guided to the beverage dispensing channel 61 through the sub channel 91 and then be dispensed to the dispenser 62. Thus, the residual water or the beverage remaining in the beverage dispenser 6 may be removed.

A sub valve 92 opening and closing the sub channel 91 may be installed in the sub channel 91.

The sub valve 92 may be opened when the beverage is dispensed, or the cleaning is performed to open the sub channel 91.

Also, a sub check valve 93 for preventing the beverage of the beverage dispensing channel 61 from flowing back to the water supply module 5 may be installed in the sub channel 91. The sub check valve 93 may be disposed between the sub valve 92 and the beverage dispensing channel 61 with respect to the sub channel 91.

The sub channel 91 may function as a residual water removing channel of the water supply module 5. For example, when the air pump 82 is turned on in the state in which the air supply valve 159, the bypass valve 35, and the ingredient supply valve 310 are closed, the sub valve 92 is opened, the air injected into the air injection channel 81 may pass through the water supply heater 53 to flow to the sub channel 91. Then, the air may pass through the sub valve 92 to flow to the beverage dispensing channel 61 and then be dispensed to the dispenser 62. In this process, the air may be dispensed together with the water supply module 5, more particularly, the residual water remaining the water supply heater 53 and the water supply channel 55B so that residual water is removed.

Also, the sub channel 91 may function as a cleaning channel. Cleaning processes (S100 and S1100) and a dispenser cleaning process of a beverage dispensing process (S1000) will be described in detail.

Figure 2:
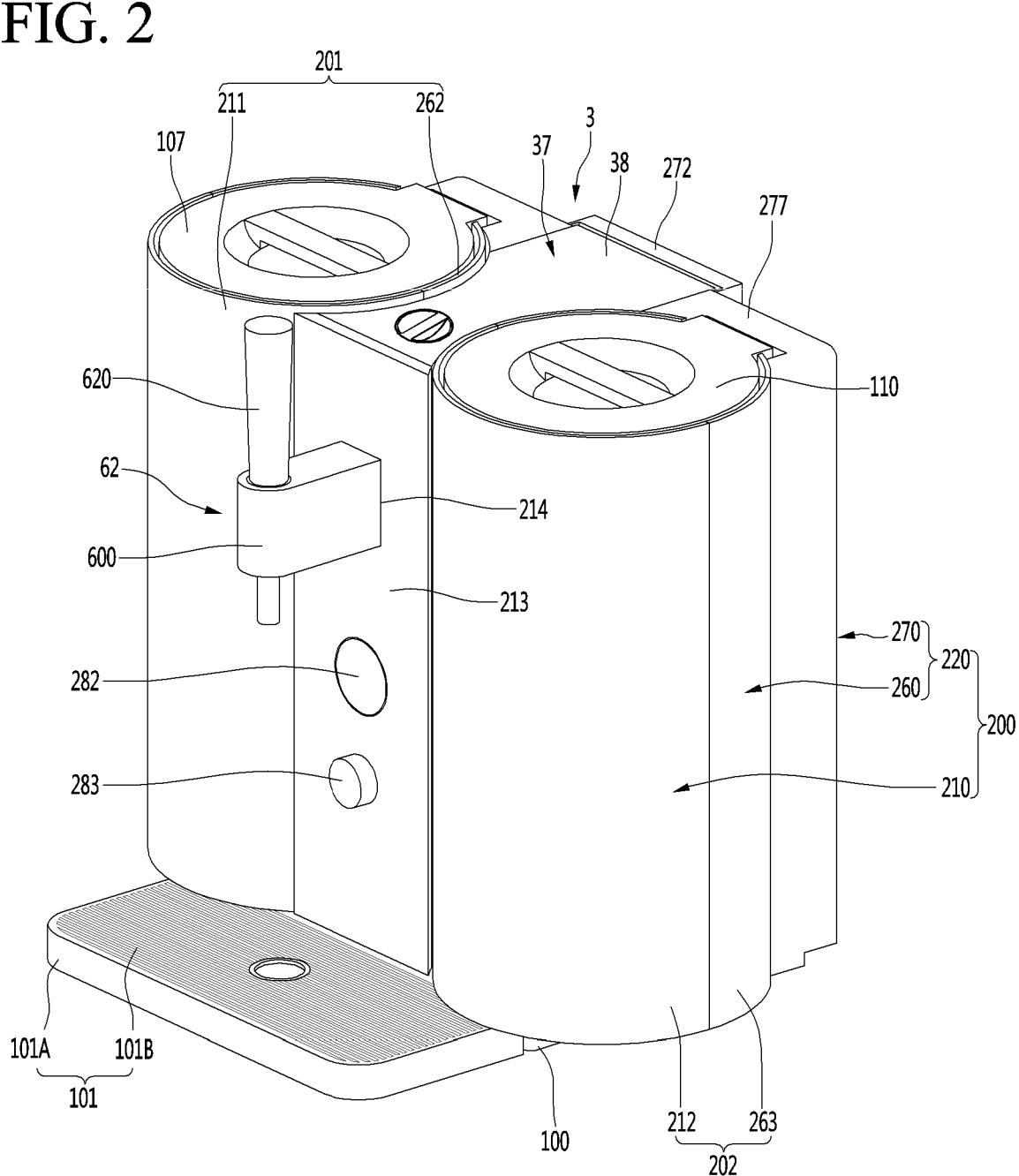
FIG. 2 is a perspective view of an example beverage maker.
Figure 3:
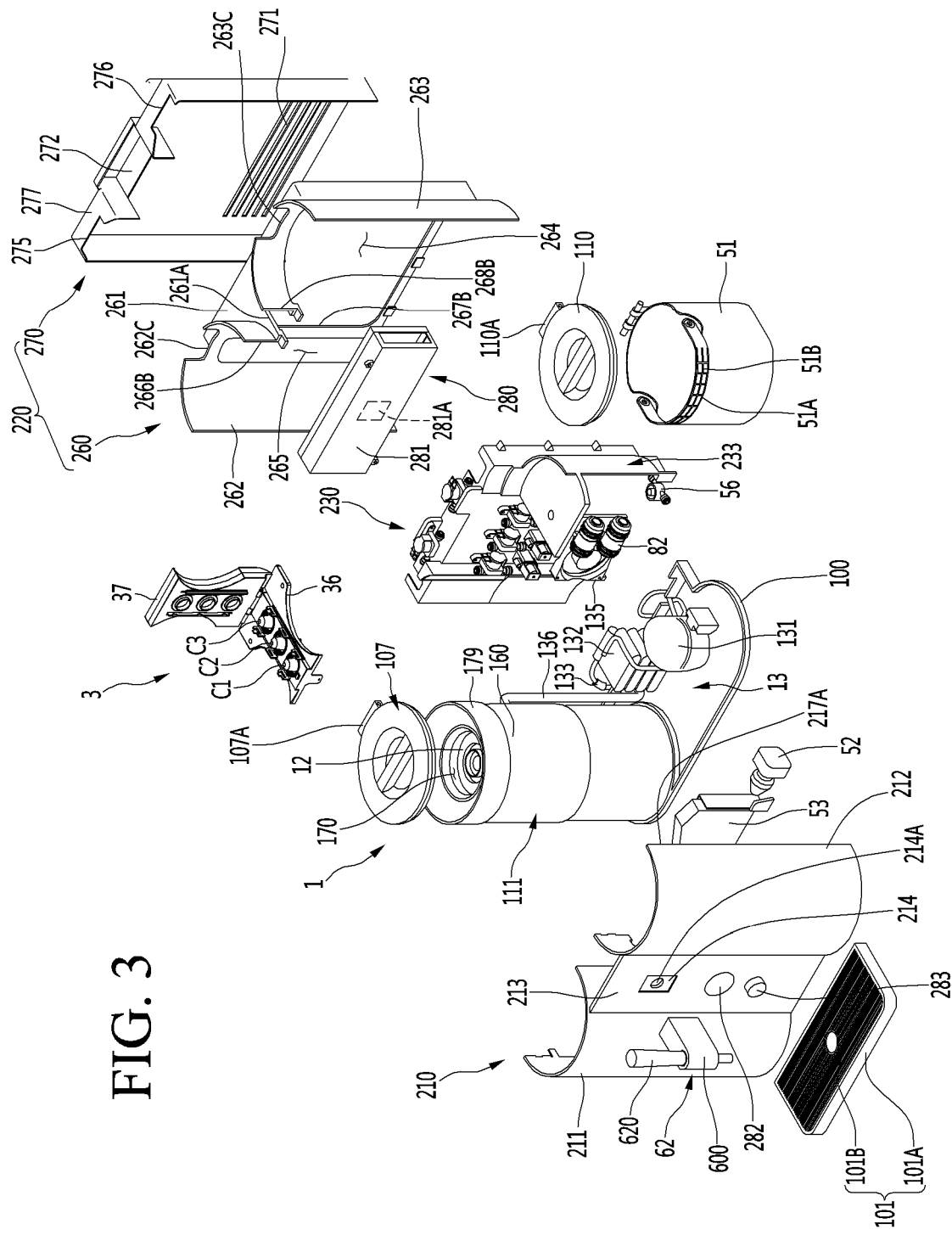
FIG. 3 is an exploded perspective view of the beverage maker of FIG. 2.

FIG. 2 is a perspective view of the beverage maker according to the first implementation, and FIG. 3 is an exploded perspective view of the beverage maker of FIG. 2.

The beverage maker may include a base 100. The base 100 may constitute an outer appearance of a bottom surface of the beverage maker and support a fermentation module 1, a refrigerant cycle device 13, a water supply heater 53, and a main frame 230, which are disposed thereabove.

The beverage maker may further include a beverage container that receives and stores a beverage dropping from the dispenser 62. The beverage container 101 may be integrated with the base 100 or be coupled to the base 10.

The beverage container 101 may include a container body 101A having a space in which the beverage dropping down from the dispenser 62 is accommodated. The beverage container 101 may include a container upper plate 101B disposed on a top surface of the container body 101A to cover a space within the container body 101A.

The container body 101A may protrude forward from a front portion of the base 100. The container body 101A may have an opened top surface.

A plurality of holes through which the beverage drop down into the container body 101A may be defined in the container upper plate 101B.

The beverage dropping around the beverage container of the beverage dropping down from the dispenser 62 may drop down onto the container upper plate 101B and be temporarily stored in the beverage container 101 through the holes of the container upper plate 101B. Thus, the surrounds of the beverage maker may be cleanly maintained.

The fermentation module 1 may have an approximately cylindrical shape. The fermentation module 1 may be supported by the base 100 at a lower side.

The fermentation module 1 may be disposed on the base 100. Here, the fermentation module 1 may be directly seated on the base 100 or be supported by a separate fermentation module support seated on the base 100 and disposed on the base 100.

The fermentation module 1 may include a fermentation module 111 having an opening 170 and a fermentation lid 107 covering the opening 170. As described above, a fermentation container 12 may be accommodated in the fermentation module 111.

A fermentation tank 112 may be accommodated in the fermentation case 160. An insulation part may be disposed between the fermentation tank 112 and the fermentation case 160 to insulate the fermentation tank 112. Here, an evaporator (see reference numeral 134 of FIG. 1) and a heater (see reference numeral 14 of FIG. 1) may be disposed between the insulation part and the fermentation tank 112. That is, the insulation part may surround the evaporator 134 and/or the heater 14 together with the fermentation tank 112. Thus, the fermentation tank 112 may be easily controlled in temperature.

The fermentation lid 107 may be disposed above the fermentation module 111 to open and close the opening 170 of the fermentation module 111 at an upper side.

The fermentation module 111 may further include a lid seating body 179 on which the fermentation lid 107 is seated. A lid seating body 179 may be disposed above the fermentation case 160 to support the fermentation lid 107 at a lower side.

The fermentation case 160 may constitute an outer appearance of a portion of a lower portion of the fermentation module 1, and the fermentation lid 107 may constitute an outer appearance of a portion of an upper portion of the fermentation module 1.

The fermentation case 160 may be placed on the base 100.

The fermentation lid 107 may be separably connected to the fermentation module 111, slidably connected to the fermentation module 111, or rotatably connected to the fermentation module 111. For example, the fermentation lid 107 may be hinge-coupled to the fermentation module 111.

The fermentation lid 107 may include a first hinge connecting portion 107A protruding backward. The first hinge connecting portion 107A may be hinge-coupled to the fermentation module 111.

The refrigerant cycle device 13 may include a compressor 131, a condenser 132, an expansion mechanism 133, and an evaporator (see reference numeral 134 of FIG. 1). The beverage maker may further include a blower fan 135 cooling the condenser 132.

The refrigeration cycle device 13 may include a heat pump. The refrigerant cycle device 13 may include a refrigerant channel switching valve. The refrigerant channel switching valve may include a four-way valve. The refrigerant channel switching valve may be connected to each of a suction channel of the compressor 131 and a discharge channel of the compressor 131. Also, the refrigerant channel switching valve may be connected to the condenser 132 through the condensation connection channel and be connected to the evaporator 134 through the evaporator connection channel.

When the fermentation tank 112 is cooled, the refrigerant channel switching valve may guide a refrigerant compressed in the compressor 131 to the condenser 132 and guide a refrigerant discharged from the evaporator 134 to the compressor 131.

When the fermentation tank 112 is heated, the refrigerant channel switching valve may guide the refrigerant compressed in the compressor 131 to the evaporator 134 and guides the refrigerant discharged from the condenser 132 to the compressor 131.

The base 100 may support at least a portion of the refrigerant cycle device 13. For example, the compressor 131 and the condenser 132 of the refrigerant cycle device 13 may be supported by the base 100.

Also, a pipe 136 may be connected to the fermentation module 1. A portion of a refrigerant pipe constituting the refrigerant cycle device (see reference numeral 13 of FIG. 1) may be built in the pipe 136. In more detail, a refrigerant pipe connecting the expansion mechanism 133 to the evaporator (see reference numeral 134 of FIG. 1) may be built in the pipe 136.

The water tank 51 may be disposed above the base 100 and spaced apart from the base 100. The water tank 51 may be vertically spaced apart from the base 100 by a water tank support 233 that will be described later.

The water tank 51 may be horizontally spaced apart from the fermentation module 1. In more detail, the water tank 51 and the fermentation module 1 may be horizontally spaced apart from each other.

The water tank 51 may have an opened top surface. The water tank 51 may have front and rear curved surfaces that are rounded in the horizontal direction and both planar side surfaces. Here, each of the front and rear surfaces of the water tank 51 may have the same curvature as that of an outer circumferential surface of the fermentation module 1.

However, this implementation is not limited thereto. For example, the water tank 51 may vary in shape as necessary. For example, the water tank 51 may have a hollow shape having an opened top surface.

A water tank handle 51B may be disposed on the water tank 51. The water tank handle 51B may be rotatably connected to the water tank 51. In more detail, the water tank handle 51B may have both ends that are hinge-coupled to both side surfaces of the water tank 51.

A user may hold the water tank handle 51B to lift the water tank 51 in the state in which the water tank handle 51B rotates upward.

A stepped portion 51a may be disposed on an upper end of the water tank 51. A portion of an upper end of the water tank 51 may be stepped to form the stepped portion 51a. Thus, the stepped portion of the water tank 51 may have a height less than that of the renaming upper end of the water tank 51. A portion of a front portion of the upper end of the water tank 51 may be stepped to form the stepped portion 51a.

The water tank handle 51B may contact the stepped portion 51a. Here, the water tank handle 51B may have a width equal to the stepped height of the stepped portion. Also, the water tank handle 51B may have a bent portion. The bent portion may have the curvature as that of the front surface of the water tank 51.

The beverage maker may further include a water tank lid 110 covering the opened top surface of the water tank 51. The water tank lid 110 may open and close an inner space of the water tank 51.

The water tank lid 110 may be rotatably connected to the water tank 51.

The water tank lid 110 may include a second hinge connecting portion 110A protruding backward. The second hinge connecting portion 110A may be hinge-coupled to the water tank 51.

The water tank lid 110 may have a shape that is equal to or similar to the fermentation lid 107. Thus, the beverage maker may have unity in design, and the same component may be used for each of the water tank lid 110 and the fermentation lid 107.

A height from the base 100 to the fermentation lid 107 may be equal to that from the base 100 to the water tank lid 110. In more detail, a top surface from the base 100 to the fermentation lid 107 may have the same height as a top surface from the base 100 to the water tank lid 110.

The beverage maker may further include an outer case 200.

The outer case 200 may be placed on the base 100.

The outer case 200 may define an outer appearance of the beverage maker.

The outer case 200 may include a fermentation module cover 201 covering the fermentation module 1 and a water tank cover 202 covering the water tank 51. Each of the fermentation module cover 201 and the water tank cover 202 may have a hollow shape. A portion of a circumferential surface of each of the fermentation module cover 201 and the water tank cover 202 may be opened.

The fermentation module cover 201 and the water tank cover 202 surround at least portions of outer circumferences of the fermentation module 1 and the water tank 51, respectively. The fermentation module cover 201 and the water tank cover 202 fix the fermentation module 1 and the water tank 51 to protect the fermentation module 1 and the water tank 51 against an external impact.

The fermentation module cover 201 and the water tank cover 202 may be horizontally disposed to be spaced apart from each other.

The fermentation module cover 201 and the water tank cover 202 may have the same height and/or diameter. Thus, the beverage maker may be improved in design due to symmetric structure and unity of the outer appearance thereof.

The outer case 200 may be provided as an assembly of a plurality of members. The outer case 200 may include a front cover 210 and a rear cover 220.

The front cover 210 may be disposed at the front side of the fermentation module 1, the water tank 51, and the main frame 230, and the rear cover may be disposed at the rear side of the fermentation module 1, the water tank, and the main frame 230.

The front cover 210 may define an outer appearance of the front side of the beverage maker.

The front cover 210 may be mounted on the dispenser 62. The dispenser 62 may be disposed closer to an upper end of the front cover 210 than a lower end of the front cover 210. The dispenser 62 may be disposed above the beverage container 101. The user may open the dispenser 62 to dispense the beverage.

The front cover 210 may be provided as an assembly of a plurality of members.

The front cover 210 may include a front fermentation module cover 211, a front water tank cover 212, and a center cover 213.

The front fermentation module cover 211 may cover a portion of the front portion of the outer circumference of the fermentation module 1. The front fermentation module cover 211 may be a portion of the front portion of the fermentation module cover 201.

The front fermentation module cover 211 may constitute the fermentation module cover 201 together with the rear fermentation module cover 262 of the rear cover 220. That is, the fermentation module cover 201 may include a front fermentation module cover 211 and a rear fermentation module cover 262. The front fermentation module cover 211 and the rear fermentation module cover 262 may be coupled to each other.

The rear fermentation module cover 262 may cover a portion of the rear portion of the fermentation module 1. The rear fermentation module cover 262 may be a portion of the rear portion of the fermentation module cover 201. The rear fermentation module cover 262 may be disposed at the rear side of the front fermentation module cover 211.

The front water tank cover 212 may cover the front surface of the water tank 51. The front water tank cover 212 may be a portion of the front portion of the water tank cover 202.

The front water tank cover 212 may constitute the water tank cover 202 together with the rear water tank cover 263 of the rear cover 220. That is, the water tank cover 202 may include the front water tank cover 212 and the rear water tank cover 263. The front water tank cover 212 and the rear water tank cover 263 may be coupled to each other.

The rear water tank cover 263 may cover a portion of the rear portion of the outer circumference of the water tank 51. The rear water tank cover 263 may be disposed at the rear side of the front water tank cover 212.

The center cover 213 may be disposed between the front fermentation module cover 211 and the front water tank cover 212. The center cover 213 may have both ends respectively contacting the front fermentation module cover 211 and the front water tank cover 212.

The center cover 213 may have a flat plate shape that is vertically disposed.

The center cover 213 may have the same height as each of the front fermentation module cover 211 and the front water tank cover 212.

A dispensing valve mounting part 214 on which the dispenser 62 is mounted may be disposed on the center cover 213. A dispenser body 600 of the dispenser 62 may be mounted on the dispensing valve mounting part 214. The dispensing valve mounting part 214 may be disposed closer to an upper end of the center cover 213 than a lower end of the center cover 213.

A through-hole 214A that is opened forward and backward may be defined in the dispensing valve mounting part 214. The beverage dispensing channel 61 or the dispensing channel may pass through the through-hole 214A and then be coupled to each other.

The beverage maker may include a display 282 for displaying various pieces of information of the beverage maker. The display 282 may be disposed on the center cover 213.

The display 282 may be disposed at a portion of the center cover 213, which is not covered by the dispenser 62. That is, the display 282 may not overlap the dispenser 62 in the horizontal direction.

The display 282 may include a display element such as an LCD, an LED, an OLED, and the like. The display 282 may include a display PCB on which the display element is installed. The display PCB may be mounted on a rear surface of the center cover 213 and electrically connected to a controller 281A that will be described later.

The beverage maker may include an input unit receiving a command related to the making of the beverage maker.

The input unit may include at least one of a touch screen receiving a user's command in a touch member, a rotary knob held by the user to rotate, or a button pushed by the user.

For example, the input unit may include the rotary knob 283. The rotary knob 283 may be disposed on the center cover 213. The rotary knob 283 may be disposed below the display 282.

The rotary knob 283 may function as a button that is pushed by the user. That is, the user may hold the rotary knob 283 so that the rotary knob 283 rotates, or the user may input a control command by pushing a front surface of the rotary knob 283.

Also, the input unit may include the touch screen receiving the user's command in the touch manner. The touch screen may be provided on the display 282, or the display 282 may function as the touch screen.

The input unit may be electrically connected to the controller 281A that will be described later.

Also, the beverage maker may further include a wireless communication module. This implementation is not limited to kinds of wireless communication modules. For example, the wireless communication module may include a Bluetooth module and Wi-Fi module.

The wireless communication module may be disposed on a rear surface of the center cover 213.

The wireless communication module may be electrically connected to the controller 281A that will be described later. The beverage maker may wirelessly communicate with a separate mobile terminal and the like. The user may input a command, inquire making information, or monitor a making process in real time by using the mobile terminal.

The rear cover 220 may be coupled to the front cover 210, and an inner space of the outer case 200 may be defined between the rear cover 220 and the front cover 210.

The rear cover 220 may include a first rear cover 260 and a second rear cover 270.

The first rear cover 260 may be placed on the base 100, and the second rear cover 270 may be mounted at a rear side of the first rear cover 260.

The first rear cover 260 may have an opening 264 that is opened forward and backward. In more detail, the cover body 261 may have an opening 264 that is opened forward and backward. The opening 264 may be disposed to face the main frame 230 in the front and rear direction. Thus, the user may be accessible to the inside of the beverage maker without separating the first rear cover 260.

The first rear cover 260 may include a cover body 261, a rear fermentation module cover 262, and a rear water tank cover 263. As described above, the rear fermentation module cover 262 may constitute the fermentation module cover 201 together with the front fermentation module cover 211, and the rear water tank cover 263 may constitute the water tank cover 202 together with the front water tank cover 212.

The rear fermentation module cover 262 and the rear water tank cover 263 may be mounted on the cover body 261. The rear fermentation module cover 262 and the rear water tank cover 263 may be mounted at a front side with respect to the cover body 261.

A portion of a top surface of the cover body 261 may be disposed between the rear fermentation module cover 262 and the rear water tank cover 263.

Avoiding grooves 262C and 263C may be defined in upper ends of the rear fermentation module cover 262 and the rear water tank cover 263, respectively. The first avoiding groove 262C defined in the rear fermentation module cover 262 may correspond to a first hinge connecting portion 107A disposed on the lid body 109 of the fermentation lid 107, and the second avoiding groove 263C defined in the rear water tank cover 263 may correspond to a second hinge connecting portion 110A disposed on the water tank lid 110.

Each of the avoiding grooves 262C and 263C may be a constituent for avoiding interference with each of the hinge connecting portions 107A and 110A.

A through-hole 265 may be defined in the rear fermentation module cover 262. The through-hole 265 may be lengthily defined in the vertical direction and be opened in the front and rear direction. The channels connected to the fermentation module 1 may not interfere with the rear fermentation module cover 262 by the through-hole 265.

The cover body 261 may support the ingredient supplier 3. At least a portion of the ingredient supplier may be placed on a top surface of the cover body 261, and the cover body 261 may support the ingredient supplier 3 at a lower side.

A connection channel avoiding groove 261A for avoiding interference with the connection channels (see reference numerals 311 and 312 of FIG. 2) of the ingredient supplier 3 may be defined in the cover body 261.

The second rear cover 270 may be mounted at a rear side of the first rear cover 260. The second rear cover 270 may cover an opening 264 defined in the first rear cover 260.

The second rear cover 270 may be mounted on the cover body 261 of the first rear cover 260. The second rear cover 270 may be mounted to surround both side surfaces of the first rear cover 260.

An upper end of the second rear cover 270 may be mounted at the same height as the upper end of each of the rear fermentation module cover 262 and the rear water tank cover 263.

At least one through-hole 271 may be defined in the rear cover 220, more particularly, the second rear cover 270. The through-hole 271 may be defined to face the opening 264 and/or the through-hole 265 defined in the first rear cover 260.

A gas discharged from the gas discharge valve (see reference numeral 73 of FIG. 1) or the pressure release valve (see reference numeral 76 of FIG. 1) may be discharged to the outside of the beverage maker through the through-hole 271. Also, air exhausted from the exhaust valve (see reference numeral 156 of FIG. 1) may be exhausted to the outside of the beverage maker through the through-hole 271.

The blower fan 135 may be disposed at a front side of the condenser 132. In more detail, the blower fan 135 may be disposed at a position that overlaps the opening 264 and the through-hole 271 in the front and rear direction, and the condenser may be disposed between the blower fan 135 and the through-hole 271. The air heat-exchanged in the condenser 132 may sequentially pass through the opening 264 and the through-hole 271 by the blower fan 135 and be discharged to the outside of the outer case 200.

An ingredient supplier accommodating part 272 may be disposed in the second rear cover 270.

The ingredient supplier accommodating part 272 may be disposed on an upper end of the second rear cover. A portion of a rear portion of the ingredient supplier 3 may be accommodated in the ingredient supplier accommodating part 272.

Also, a third avoiding groove 275 and a fourth avoiding groove 276 may be defined in the second rear cover 270. The third avoiding groove 275 may correspond to the first avoiding groove 262C defined in the rear fermentation module cover 262, and the fourth avoiding groove 276 may correspond to the second avoiding groove 263C defined in the rear water tank cover 263.

The ingredient supplier 3 may be disposed between the fermentation module 1 and the water tank 51. Thus, when compared with a case in which the ingredient supplier 3 is disposed at a position except between the fermentation module 1 and the water tank 51, the ingredient supplier 3 may be more compact, and the ingredient supplier 3 may be protected by the fermentation module 1 and the water tank 51.

At least a portion of each of both side surfaces of the ingredient supplier 3 may be curved, and the curved surface may contact each of an outer circumference of the fermentation module cover 201 and an outer circumference of the water tank cover 202.

The ingredient supplier 3 may be disposed above the base 100 so as to be vertically spaced apart from the base 100. The ingredient supplier 3 may be disposed above the main frame 230.

The ingredient supplier 3 may be disposed between the front cover 210 and the rear cover 220 in the front and rear direction. A front surface of the ingredient supplier 3 may be covered by the front cover 210 and the center cover 213, and a rear surface of the ingredient supplier 3 may be covered by the ingredient supplier accommodating part 272 of the second rear cover 270.

The ingredient supplier 3 may be supported by the cover body 261 of the first rear cover 260 and the ingredient supplier accommodating part 272 of the second rear cover 270.

The ingredient supplier 3 may include an ingredient accommodating body 36 on which capsule mounting parts 31, 32, and 33, on which capsules C1, C2, and C3 are detachably mounted, are disposed and a lid module 37 covering the capsule mounting parts 31, 32, and 33.

The ingredient accommodating body 36 may be supported by the cover body 261 of the first rear cover 260 and the ingredient supplier support part 273 of the second rear cover 270.

The lid module 37 may be slidably disposed or rotatably disposed on the ingredient accommodating body 36. The lid module 37 may be hinge-coupled to the ingredient accommodating body 36.

The ingredient supplier 3 may be installed in an approximately central upper portion of the beverage maker, and the user may rotate the lid module 37 of the ingredient supplier 3 to easily mount or separate capsules C1, C2, and C3.

The beverage maker may include a main frame 230. The main frame may be a constituent to which at least portions of the valves and the channels, which are described above, are fixed.

The main frame 230 may be disposed between the front cover 210 and the rear cover 220 in the front and rear direction. The main frame 230 may be disposed to contact the outer circumference of the fermentation module 1.

The main frame 230 may be placed on the base 100. The main frame 230 may include a water tank support 233, and the water tank support 233 may vertically space the water tank 51 from the base 100.

At least a portion of the main frame 230 may be disposed below the ingredient supplier 3.

At least one of the water supply pump 52, the water supply heater 53, the blower fan 135, or the air pump 82 may be mounted on the main frame 230. For example, the blower fan 135 and the air pump 82 may be mounted on the main frame 230, and the water supply pump 52 and the water supply heater 53 may be mounted on the base 100.

The main frame 230 may partition the condenser 132 from the fermentation module 1 to prevent a temperature of the fermentation module 1 from increasing by heat of the condenser 132.

The compressor 131 may be disposed between the base 100 and the water tank 51 in the vertical direction.

The water supply heater 53 and the water supply pump 52 may be disposed at a front side of the main frame 230. The condenser 132 may be disposed at the rear side of the blower fan 135 mounted on the main frame 230.

The condenser 132 may be disposed to face the blower fan 135 mounted on the main frame 230. The condenser 132 may be disposed at the rear side of the blower fan 135.

The beverage maker may include a control module 280 controlling the beverage maker.

The control module 280 may be an electric component of the beverage maker. The control module 280 may be separably mounted on the main frame 230.

The control module 280 may be disposed on the main frame 230. The control module 280 may be coupled to the rear surface of the main frame 230.

The PCB case 281 may be coupled to the main frame 230 to safely protect the main PCB therein.

At least a portion of the control module 280 may be disposed to face the opening 264 defined in the first rear cover 260.

The control module 280 may include a main PCB and a PCB case 281 in which the main PCB is built. The main PCB may include a controller 281A substantially controlling an operation of each of the constituents of the beverage maker.

The controller 281A provided in the control module 280 may be electrically connected to the wireless communication module. For example, the controller 281A may receive a command received through the wireless communication module, and thus, the beverage may be made. Also, the controller 281A may transmit information related to the beverage maker or the beverage to be made from the wireless communication module to a separate mobile terminal.

Also, the controller 281A may receive the command inputted into the input unit. For example, the controller 281A may make a beverage according to the command inputted by the rotary knob 283. Also, the controller 281A may control the display 282 to output various pieces of information of the beverage maker. For example, the controller 281A may display an amount of dispensed beverage, an amount of residual beverage, information related to completion of dispensing of the beverage, and the like through the display 282.

The controller 281A may control at least one of the water supply pump 52, the water supply heater 53, the air pump 82, or the temperature controller 11. Also, controller 281A may control at least one of the flow rate control valve 54, the ingredient supply valve 310, the main valve 44, the bypass valve 35, the air supply valve 159, the exhaust valve 156, the beverage dispensing valve 64, the sub valve 92, the gas discharge valve 73, or the pressure release valve 76.

The controller 281A may receive a measured value of at least one of the flow meter 56, the thermistor 54A, the water supply temperature sensor 57, the temperature sensor 16, or the gas pressure sensor 72.

In more detail, the controller 281A may detect an inner pressure of the fermentation container 12 by the gas pressure sensor 72 and detect a temperature of the fermentation tank 112 by the temperature sensor 16. The control module 280 may determine a degree of fermentation of the beverage by using the detected pressure or temperature.

Also, the controller 281A may detect a temperature of water supplied from the water supply module 5 to the first main channel 41 by using the water supply temperature sensor 57. The controller 281A may control the water supply heater 53 according to the detected temperature of the water.

Also, the controller 281A may control the temperature controller 11 to maintain the temperature of the fermentation tank 112 to an adequate temperature.

Also, the controller 281A may accumulate at least one of a time taken to open the dispenser 62, a time taken to drive the air pump 82, or a time taken to turn on the main valve 44 after the beverage is completely made. The controller 281A may calculate the amount of dispensed beverage that is dispensed from the fermentation container 12 according to the accumulated time. The controller 281A may calculate the amount of residual beverage from the calculated amount of dispensed beverage. The controller 281A may determine whether the beverage within the fermentation container 12 is completely dispensed from the information of the calculated amount of residual beverage. The controller 281A may determine that the beverage is completely dispensed when it is determined that the beverage within the fermentation container 12 is completely dispensed.

In addition, the controller 281A may control an overall operation of the beverage maker. This will be described below in detail.

Figure 4:
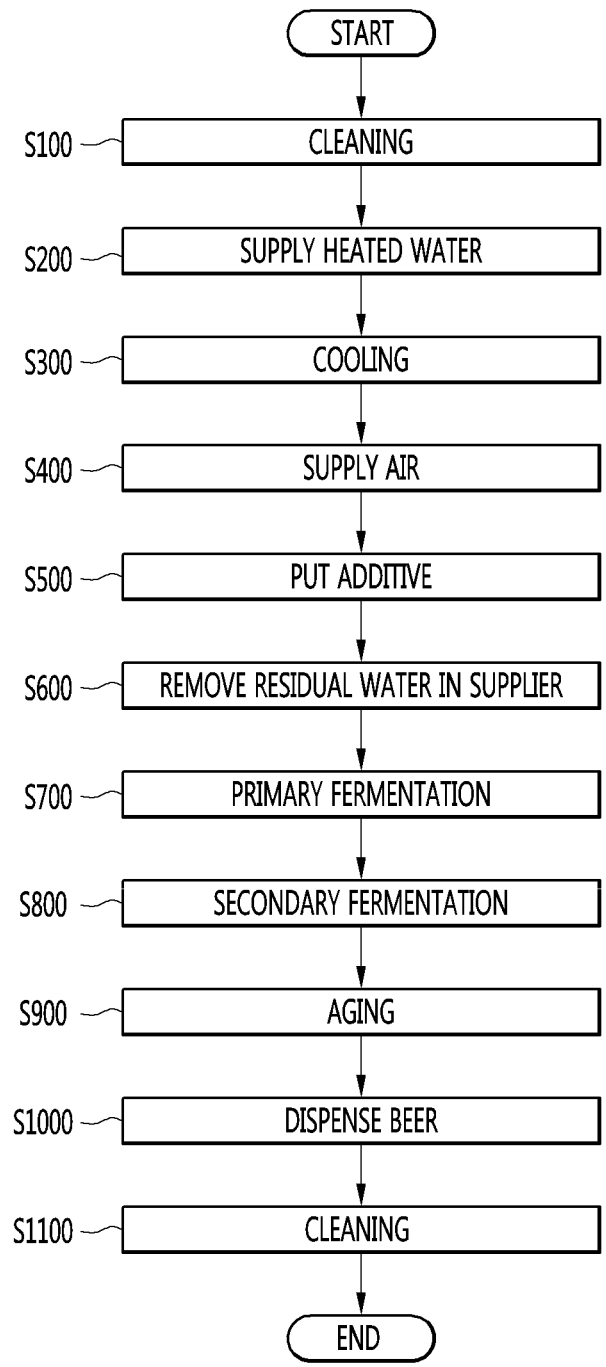
FIG. 4 is a flowchart illustrating an example method for controlling an example beverage maker.

FIG. 4 is a flowchart illustrating an example method for controlling the beverage maker according to the first implementation.

Hereinafter, an operation of the beverage maker according to this implementation will be described with reference to FIGS. 1 and 4.

The beverage maker according to this implementation may include cleaning processes (S100 and S1100) for cleaning the channels. The cleaning processes (S100 and S1100) may be separately performed with respect to a beverage making process.

The cleaning processes (S100 and S1100) may be performed before and after the beverage making process.

Also, the cleaning processes (S100 and S1100) may be performed by a user input during the beverage making process. In this case, like a primary fermentation process (S700) or a secondary fermentation process (S800), which will be described later, the cleaning processes (S100 and S1100) may be performed while the main valve 44 is closed, and the additives are contained in the ingredient supplier 3.

The cleaning processes (S100 and S1100) may be performed in a state in which the capsules C1, C2, and C3 are not accommodated in the ingredient supplier 3.

On the other hand, the cleaning processes (S100 and S1100) may be performed in a state in which the capsules C1, C2, and C3 are accommodated in the ingredient supplier 3, and the fermentation container 12 is accommodated in the fermentation tank 112.

The user may input a cleaning command through the input unit provided in the control module 280, a remote controller, or a portable terminal. The controller 281A may control the beverage maker to perform the cleaning processes (S100 and S1100) according to the input of the cleaning command.

Also, the user may input a beverage making command through the input unit provided in the control module 280, a remote controller, or a portable terminal. The controller 281A may control the beverage maker to perform the cleaning processes (S100 and S1100) before and after the beverage making process according to the input of the beverage making process.

Hereinafter, the cleaning process (S100) performed before the beverage making process will now be described.

When the dispenser 62 is in a closed state, the controller 281A may display a message for opening the dispenser 62 on the display 282, and thus, the user may open the dispenser 62.

When the dispenser 62 is opened, and the cleaning command is inputted through the input unit, the remote controller, or the portable terminal, the controller 281A may open the beverage dispensing valve 64 to turn on the water supply pump 52 and the water supply heater 53. Also, the controller 281A may control the main valve 44 to be maintained in the closed state.

The controller 281A may perform cleaning of the ingredient supplier 3 and the bypass channel 4C. The controller 281A may open the ingredient supply valve 310 and the bypass valve 35. Also, the controller 281A may perform cleaning of the sub channel 91. The controller 281A may open the sub valve 92.

When the water supply pump 52 is turned on, water of the water tank 51 may flow to the water supply heater 53 and then be heated in the water supply heater 53.

The water (i.e. The heated water) heated by the water supply heater 53 may flow to be divided into the sub channel 91 and the first main channel 41.

The water flowing to the sub channel 91 may pass through the sub valve 92 to flow to the beverage dispensing channel 61 and then pass through the beverage dispensing valve 64 and be dispensed to the dispenser 62.

Also, the water flowing to the first main channel 41 may flow to be divided into the ingredient supplier 3 and the bypass channel 43.

The water flowing to the ingredient supplier 3 may sequentially pass through the ingredient supply valve 310, the initial capsule mounting part 31, the intermediate capsule mounting part 32, and the final capsule mounting part 33 to flow the second main channel 42 and then flow to the beverage dispensing valve 64 to pass through the beverage dispensing valve 64 so as to be dispensed to the dispenser 62.

The water flowing to the bypass channel 43 may pass through the bypass valve 35 to flow the second main channel 42 and then flow to the beverage dispensing channel 61 to pass through the beverage dispensing valve 64 so as be dispensed to the dispenser 62.

When controlled as described above, the main channels 41 and 42, the bypass channel 43, the sub channel 91, the beverage dispensing channel 61, and the valves installed in the channels, and the dispenser 62 may be sterilized and washed. Also, the capsule mounting parts 31, 32, and 33, and the connection channels 311 and 312 may be sterilized and washed.

In the beverage maker, the cleaning may be performed during a cleaning set time. After the cleaning set time, the cleaning process may be completed.

When the cleaning set time elapses, the controller 281A may turn off the water supply pump 52 and the water supply heater 53 to close all of the beverage dispensing valve 64, the bypass valve 35, the ingredient supply valve 310, and the sub valve 92.

Also, the beverage making process of making a beverage may be performed on the beverage maker according to this implementation.

For the beverage making process, the user may open the fermentation lid 107 and insert the fermentation container 12 into the opening 170 to seat the fermentation container 12 on the fermentation module 1. Here, malt may be in a state of being contained in the fermentation container 12. The malt may be accommodated in the form of malt oil.

Thereafter, the user may close the fermentation lid 107, and the fermentation container 12 may be accommodated in the fermentation module 111 and the fermentation lid 107. Here, the inside of the fermentation tank 112 may be closed by the fermentation lid 107.

Also, the user may insert the plurality of capsules C1, C2, and C3 into the ingredient supplier 3 before the fermentation container 12 is seated to cover the plurality of capsule mounting parts 31, 32, and 33 by using the lid module 37.

The user may input the beverage making command through the input unit, the remote controller, or the mobile terminal connected to the controller 281A. The controller 281A may control the beverage maker to perform the beverage making process according to the input of the beverage making command.

The beverage making process may include a water supply process (S200).

The water supply process (S200) may be a liquid malt formation process of mixing the malt in the fermentation container 12 with the heated water to form liquid malt.

In the water supply process (S200), the controller 281A may turn on the water supply pump 52 and the water supply heater 53 and close the ingredient supply valve 310. In the water supply process (S200), the controller 281A may turn off the bypass valve 35 and the main valve 44.

When the water is supplied to the fermentation container 12, the controller 281A may turn off the exhaust valve 156.

In the above-described control, the water discharged from the water tank 51 may pass through the water supply pump 52 to flow to the water supply heater 53 and then be heated in the water supply heater 53. The water heated by the water supply heater 53 may flow from the first main channel 41 to the bypass valve 35 to pass through the bypass valve 35 and then flow to the second main channel 42. The water flowing to the second main channel 42 may pass through the main valve 44 and be introduced into the fermentation container 12. The heated water introduced into the fermentation container 12 may be accommodated in the fermentation container 12 and then be mixed with the malt. The malt within the fermentation container 12 may be mixed with the water and gradually diluted. Since the heated water is supplied to the fermentation container 12, the malt accommodated in the fermentation container 12 may be quickly uniformly mixed with the heated water.

When the water is introduced as described above, the fermentation container 12 may be gradually expanded. Thus, a portion of air between the outer surface of the fermentation container 12 and the inner wall of the fermentation tank 112 may flow to the air supply channel 154 and then be discharged to the exhaust valve 156 due to the expansion of the fermentation container 12.

Thus, while the water is introduced into the fermentation container 12, the fermentation container 12 may receive the water without being blown or torn in the fermentation tank 112.

In the water supply process (S200), the water supply heater 53 may heat the water at a temperature of about 50° C. to about 70° C. The controller 281A may control the water supply heater 53 according to the temperature by the water supply temperature sensor 57.

The controller 281A may perform the water supply process (S200) until an amount of accumulated water detected by the flow meter 56 reaches a set flow rate, and when the amount of accumulated water detected by the flow meter 56 reaches the set flow rate, the water supply process (S200) may be completed.

When the water supply process (S200) is completed, the controller 281A may turn off the water supply pump 52 and the water supply heater 53 and close the bypass valve 35. When the water supply process (S200) is completed, the controller 281A may close the gas discharge valve 73 and the exhaust valve 156.

While the water supply process (S200) is performed, the controller 281A may control the fermentation container 12 so that the air is introduced into the fermentation container 12.

The controller 281A may control the fermentation container 12 to stop the operation of the fermentation container 12 after the water is primarily introduced into the fermentation container 12 and then to stop the operation of the fermentation container 12 after the air is injected into the fermentation container 12, and finally, to stop the operation of the fermentation container 12 after the heated water is secondarily introduced into the fermentation container 12. After the primary water introduction, the air injection, and the secondary water introduction are successively completed, the water supply process (S200) may be completed.

For example, in the water supply process (S200), only a heated water supply process of supplying the heated water may be performed.

For another example, in the water supply process (S200), a primary heated water supply process of primarily supplying the heated water, an air injection process of injecting the air, and a secondary heated water supply process of secondarily supplying the heated water may be successively performed.

For example, when only the heated water supply process is performed, the water supply process (S200) may be the same as described above, its detailed description will be omitted.

Hereinafter, the water supply process (S200) including the primary heated water supply process, the air injection process, the secondary heated water supply process, which are successively performed, will be described as another example of the water supply process (S200).

When the primary heated water supply process starts, the controller 281A may turn on the water supply pump 52 and the water supply heater 53, turn off the bypass valve 35 and the main valve 44, and maintain the closing of the ingredient supply valve 310. Also, when the primary heated water supply process starts, the controller 281A may open the gas discharge valve 73 and the exhaust valve 156.

When the primary heated water supply process is performed, water may be introduced into the fermentation container 12, the fermentation container 12 may be expanded by the introduced water, a portion of air between the fermentation container 12 and the fermentation tank 112 may be pushed by the expanded fermentation container 12 to flow to the air supply channel 154 and then be exhausted to the outside through the exhaust valve 156.

Also, the controller 281A may determine completion of the primary heated water supply process according to a flow rate detected by the flow meter during the primary heated water supply process. When the detected flow rate detected by the flow meter 56 reaches a first set flow rate during the primary heated water supply process, the controller 281A may determine that the primary heated water supply process is completed, turn off the water supply pump 52 and the water supply heater 53, and maintain the opened state of the bypass valve 35 and the main valve 44. Also, when the primary heated water supply process is completed, the controller 281A may maintain the opened state of the gas discharge valve 73 and the exhaust valve 156.

When the primary heated water supply process is completed, the air injection process may be performed.

When the air injection process starts, the controller 281A may turn on the air pump 82. Also, the controller 281A may maintain the closing of the air supply valve 159.

While the air pump 82 is turned on, air injected into the air injection channel 81 may flow from the first main channel 41 to the second main channel through the bypass channel 43 and then be introduced into the fermentation container 12 by passing through the main valve 44. As described above, the air introduced into the fermentation container 12 may collide with liquid malt to assist the uniform mixing of the heated water and the liquid malt.

Since the air is introduced into the fermentation container 12, the fermentation container 12 may be expanded, a portion of the air between the outer surface of the fermentation container 12 and the inner wall of the fermentation tank 112 may be pushed by the expanded fermentation container 12 to flow to the air supply channel 154 and then be exhausted to the outside through the exhaust valve 156.

When a pressure detected by the gas pressure sensor 72 is equal to or greater than a set pressure, the controller 281A may complete the air injection process. For the completion of the air injection process, the controller 281A may turn off the air pump 82. When the air injection process is completed, the control module 280 may maintain the opening of the main valve 44, the bypass valve 35, the gas discharge valve 73, and the exhaust valve 156.

When the air injection process is completed, the secondary heated water supply process may be performed.

When the secondary heated water supply process starts, the controller 281A may turn on the water supply pump 52 and the water supply heater 53.

Like the primary heated water supply process, the water of the water tank 51 may be supplied to the fermentation container 12, and new heated water may be additionally supplied to the fermentation container 12.

As described above, in the secondary heated water supply process, the fermentation container 12 may be more expanded by the additionally supplied water, and a portion of the air between the outer surface of the fermentation container 12 and the inner wall of the fermentation tank 112 may be pushed by the expanded fermentation container 12 to flow to the air supply channel 154 and then be exhausted to the outside through the exhaust valve 156.

The controller 281A may determine completion of the secondary heated water supply process according to a flow rate detected by the flow meter during the secondary heated water supply process. When the detected flow rate detected by the flow meter 56 reaches a first set flow rate during the secondary heated water supply process, the controller 281A may determine that the secondary heated water supply process is completed, turn off the water supply pump 52 and the water supply heater 53, and close the main valve 44 and the bypass valve 35. Also, when the secondary heated water supply process is completed, the controller 281A may close the gas discharge valve 73 and the exhaust valve 156.

The beverage making process may include a fermentation tank cooling process (S300).

In more detail, when the water supply process (S200) is completed, the fermentation tank cooling process (S300) for cooling the fermentation tank 112 may be performed.

The controller 281A may control the temperature controller 11 to cool the fermentation tank 112. In more detail, the controller 281A may control the refrigerant cycle device to cool the fermentation tank 112. A refrigerant may pass through the evaporator 134 to absorb heat of the fermentation tank 112 and then be evaporated. When the refrigerant cycle device is driven, the fermentation tank 112 may be gradually cooled, and also, the fermentation container 12 accommodated in the fermentation tank 112 and the liquid malt accommodated in the fermentation container 12 may be cooled.

As described above, when the fermentation tank 112 is cooled, the evaporator 134 may cool the fermentation container 12, and the controller 281A may control the refrigerant cycle device 13 according to the temperature detected by the temperature sensor 16 installed in the fermentation tank 112.

The controller 281A may control the compressor so that the temperature detected by the temperature sensor 16 is maintained at the set temperature (for example, about 35° C.). In more detail, when the temperature detected by the temperature sensor 16 exceeds a compressor turn-on temperature (for example, about 35.5° C.), the controller 281A may turn on the compressor of the refrigerant cycle device 13. When the temperature detected by the temperature sensor 16 is less than a compressor turn-off temperature (for example, about 34.5° C.), the control module 280 may turn off the compressor.

When an additive input process (S500) that will be described later is performed, since the water supply heater 53 is in the closed state, a temperature of the fermentation container 12 may decrease somewhat when compared to the set temperature that is set in the cooling process (S300) by the water introduced into the fermentation container 12 together with the additives. For example, the temperature of the fermentation container 12 may decrease to a temperature of about 30° C. when the temperature of the fermentation container 12 is maintained at a temperature of about 35° C. and the additive and water are put into the fermentation container 12 together. Thus, in the cooling process (S300), the set temperature may be determined in consideration of the lowered temperature.

While the fermentation cooling process (S300) is performed, the controller 281A may maintain the closing of the exhaust valve 156 to prevent the air between the outer surface of the fermentation container 12 and the inner wall of the fermentation tank 112 from leaking through the exhaust valve 156 to the outside, thereby quickly cooling the air within the fermentation tank 112.

Exceptionally, when the temperature of the fermentation container 12 is lowered than the set temperature even through the refrigerant cycle device 13 is turned off because an external temperature is extremely low, the controller 281A may turn on the heater 14 disposed in the lower portion of the fermentation tank 112. The controller 281A may turn off the heater 14 when the temperature detected by the temperature sensor 16 is less than a heat turn-on temperature. When the temperature detected by the temperature sensor 16 is less than a heater turn-off temperature, the control module 280 may turn off the heater.

The beverage making process may include an air supply process (S400).

In more detail, after the fermentation tank cooling process (S300) starts, and the compressor of the refrigerant cycle device 13 is turned on, the beverage maker may perform the air supply process (S400) in which air is supplied into the fermentation container 12 to mix the air with the liquid malt when the temperature detected by the temperature sensor 16 is less than the compressor turn-off temperature at least once. Alternatively, when the fermentation tank cooling process (S300) starts, and the heater 14 is turned on, the beverage maker may perform the air supply process (S400) in which the air is supplied into the fermentation container 12 to mix the air with the liquid malt when the temperature detected by the temperature sensor 16 is less than the heater turn-off temperature at least once.

While the air supply process (S400) is performed, the beverage maker may control the refrigerant cycle device 13 and the heater 14 to be turned on and off according to the temperature detected by the temperature sensor 16. The control of the turn-on/off of the refrigerant cycle device 13 and the heater 14 may be continuous until the additive input process (S500) is completed.

In the air supply process (S400), the controller 281A may turn on the air pump 82 and turn off the bypass valve 35 and the main valve 44. Also, the controller 281A may turn off the gas discharge valve 73 and the exhaust valve 156 and maintain the closed state of the air supply valve 159 and the ingredient supply valve 310.

While the air pump 82 is turned on, air injected into the air injection channel 81 may flow from the first main channel 41 to the second main channel through the bypass channel 43 and then be introduced into the fermentation container 12 by passing through the main valve 44. As described above, the air introduced into the fermentation container 12 may collide with liquid malt to assist the uniform mixing of the heated water and the liquid malt, and the air colliding with the liquid malt may supply oxygen into the liquid malt. That is, the agitation and aeration may be performed.

While the air is injected into the fermentation container 12, the fermentation container 12 may be expanded by the air injected into the fermentation container 12. A portion of the air between the outer surface of the fermentation container 12 and the inner wall of the fermentation tank 112 may be pushed by the expanded fermentation container 12 to flow to the air supply channel 154 and then be exhausted to the outside through the exhaust valve 156. Thus, the fermentation container 12 may be easily expanded, and the air of the second main channel 42 may be quickly introduced into the fermentation container 12 and mixed with the liquid malt.

While the air pump 82 is turned on, the air is mixed with the liquid malt during a mixing set time, the air pump 82 is turned on, and the mixing set time elapses, the air supply process (S400) may be completed. When the air supply process (S400) is completed, the controller 281A may turn off the air pump 82 and close the bypass valve 35. Also, when the air supply process (S400) is completed, the controller 281A may close the gas discharge valve 73 and the exhaust valve 156.

The beverage making process may include the additive input process (S500).

In more detail, the beverage maker may perform the additive input process (S500) after the air supply process (S400).

In the additive input process (S500), a first additive of the first capsule C1, a second additive of the second capsule C2, and a third additive of the third capsule C3 may be put into the fermentation container 12. Here, the first capsule C1 may be a capsule mounted on the initial capsule mounting part 31, the second capsule C2 may be a capsule mounted on the intermediate capsule mounting part 32, and the third capsule C3 may be a capsule mounted on the final capsule mounting part 33.

In the additive input process (S500), the controller 281A may turn on the water supply pump 52 and maintain the turn-off of the water supply heater 53. Also, the controller 281A may maintain the closing of the bypass valve 35 and open the ingredient supply valve 310 and the main valve 44. Also, the controller 281A may open the gas discharge valve 73 and the exhaust valve 156.

When the water supply pump 52 is turned on, the water of the water tank 51 may pass through the water supply pump 52 and the water supply heater 53 to flow to the first main channel 41 and then pass through the ingredient supply valve 310 and be introduced into the first capsule C1. The water introduced into the first capsule C1 may be mixed with the first additive accommodated in the first capsule C1 to flow to the first connection channel 311 together with the first additive.

The fluid (the mixture of the water and the first additive) introduced into the second capsule C2 through the first connection channel 311 may be mixed with the second additive accommodated in the second capsule C2 to flow to the second connection channel 312 together with the second additive.

The fluid (the mixture of the water and the first and second additives) introduced into the third capsule C3 through the second connection channel 312 may be mixed with the third additive to flow to the second main channel 42 together with the third additive.

The fluid (the mixture of the water and the first, second, and third additives) flowing to the second main channel may be introduced into the fermentation container 12 by passing through the main valve 44. Thus, all of the additives contained in the capsules C1, C2, and C3 may be put into the fermentation container 12.

When the additive input process (S500) starts, the accumulated flow rate detected by the flow meter 56 reaches an additive input set flow rate, the controller 281A may complete the additive input process (S500). When the additive input process (S500) is completed, the controller 281A may turn off the water supply pump 52.

The beverage making process may further include an ingredient supplier residual water removing process (S600).

In more detail, when the additive input process (S500) is completed, the ingredient supplier residual water removing process (S600) for removing residual water within the ingredient supplier 3 may be performed.

In the ingredient supplier residual water removing process (S600), the controller may turn on the air pump 82 and maintain the closing of the air supply valve 159. Also, the controller 281A may open the ingredient supply valve 310 and the main valve 44. Also, the controller 281A may open the gas discharge valve 73 and the exhaust valve 156.

When the air pump 82 is turned on, the air injected into the air injection channel 81 may flow to the first main channel 41 to pass through the ingredient supply valve 310 and then be introduced into the first capsule C1. The air introduced into the first capsule C1 may successively pass through the first capsule C1, the second capsule C2, and the third capsule C3 to blow the residual water remaining in the capsules to the second main channel 42. The air flowing to the second main channel 42 may be introduced into the fermentation container 12 together with the residual water.

Thus, the additives and residual water that have not yet been extracted in each of the capsules C1, C2, and C3 may be put into the fermentation container 12 without leaving any residual water.

Since the residual water and the air are introduced from the second main channel 42 to the fermentation container 12, the fermentation container 12 may be more expanded, a portion of the air between the outer surface of the fermentation container 12 and the inner wall of the fermentation tank 112 may be pushed by the expanded fermentation container 12 to flow to the air supply channel 154 and then be exhausted to the outside through the exhaust valve 156. Thus, the fermentation container 12 may be easily expanded, and the air and the residual water of the second main channel 42 may be quickly introduced into the fermentation container 12.

The controller 281A may turn on the air pump 82 during the residual water removing set time, and when the residual water removing set time elapses, the ingredient supplier residual water removing process (S600) may be completed.

When the ingredient supplier residual water removing process (S600) is completed, the controller 281A may turn off the air pump 82 and close the ingredient supply valve 310 and the main valve 44. Also, the controller 281A may close the gas discharge valve 73 and the exhaust valve 156.

When the ingredient supplier residual water removing process (S600) is completed, the controller 281A may display a capsule separation message for informing separation of the capsules C1, C2, and C3 on the display 282, and the user may remove the empty capsule from the ingredient supplier 3.

The beverage making process may include fermentation processes (S700 and S800).

In more detail, after the ingredient supplier residual water removing process (S600), a primary fermentation process (S700) and a secondary fermentation process (S800) may be successively performed.

According to an example of the primary fermentation process (700), the primary fermentation process (S700) may include a pre-fermentation process and a main-fermentation process. The main-fermentation process may be performed after the pre-fermentation process is completed.

The pre-fermentation process may be a process of quickly and actively activating yeast added into the fermentation container 12 during the additive input process (S500).

In the pre-fermentation process, the controller 281A may control the refrigerant cycle device 13 and the heater 14 so that the temperature measured by the temperature sensor 16 is maintained at a pre-fermentation target temperature (for example, 30° C.). After the pre-fermentation process, the controller 281A may periodically open the gas discharge valve 73 and then close the gas discharge valve 73 to store a pressure value detected by the gas pressure sensor 72 in a storage unit just after the gas discharge valve 73 is closed. The controller 281A may calculate a variation in pressure by comparing the stored pressure value with the pressure value detected after a predetermined time elapses in the gas discharge valve 73 is closed. When the variation in calculated pressure exceeds a pre-fermentation set pressure, the controller 281A may determine that the pre-fermentation is completed, the pre-fermentation process may be completed.

When the pre-fermentation process is completed, the controller 281A may start the main-fermentation process.

In the main-fermentation process, the controller 281A may control the refrigerant cycle device 13 and the heater 14 so that the temperature measured by the temperature sensor 16 is maintained at a main-fermentation target temperature (for example, 21° C.). Here, the main-fermentation target temperature may be higher than the pre-fermentation target temperature.

After the main-fermentation process starts, the control module 280 may periodically open the gas discharge valve 73 and then close the gas discharge valve 73 to store a pressure value detected by the gas pressure sensor 72 in the storage unit while the gas discharge valve 73 is closed. When the variation in pressure that is periodically detected by the gas pressure sensor 72 exceeds the main-fermentation set pressure, the control module 280 may determine that the main-fermentation is completed, and the primary fermentation process (S700) may be completed.

However, this implementation is not limited to the primary fermentation process (S700). For example, according to another example of the primary fermentation process (S700), the primary fermentation process (S700) may not include the pre-fermentation process but may include only the main-fermentation process. Since this is duplicated, this description will be omitted.

The controller 281A may start the secondary fermentation process (S800) after the primary fermentation process (S700).

When the secondary fermentation process (S800) is performed, the controller 281A may control the refrigerant cycle device 13 and the heater 14 so that the temperature measured by the temperature sensor 16 becomes a secondary fermentation target temperature.

In the secondary fermentation process (S800), since an inner pressure of the fermentation container 12 is high, if the gas discharge valve 73 is opened, large noise may occur. To solve this limitation, the controller 281A may maintain the closing of the gas discharge valve 73 during the secondary fermentation process (S800) and control opening/closing of the pressure release valve 78 provided with the noise reducing device 77.

After the secondary fermentation process (S800) starts, the controller 281A may periodically open the pressure release valve 76 and then close the pressure release valve 76 to store a pressure value detected by the gas pressure sensor 72 in the storage unit while the pressure release valve 76 is closed. When the variation in pressure that is periodically detected by the gas pressure sensor 72 exceeds a secondary fermentation set pressure, the controller 281A may determine that the secondary fermentation is completed, and the secondary fermentation process (S800) may be completed.

The beverage making process may include an aging process (S900).

In more detail, when all of the primary fermentation process (S700) and the secondary fermentation process (S800) are completed, the aging process (S900) may be performed.

In the aging process, the controller 281A may standby for an aging time and control the refrigerant cycle device 13 and the heater 14 so that a temperature of the beverage is maintained between an upper limit value and a lower limit value of a set aging temperature during the aging time.

Since the beverage maker is mainly used in an indoor space, an external temperature of the beverage maker may be maintained between the upper limit value and the lower limit value of the set aging temperature or have a temperature higher than the upper limit value of the set aging temperature. In this case, when the temperature detected by the temperature sensor 16 is less than the lower limit value of the set aging temperature, the controller 281A may turn off the compressor of the refrigerant cycle device 13, and when the temperature detected by the temperature sensor 16 is greater than the upper limit value of the set aging temperature, the controller 281A may turn on the compressor.

Exceptionally, in the case in which the external temperature of the beverage maker is less than the lower limit value of the set aging temperature, the controller 281A may turn on the heater 14 when the temperature detected by the temperature sensor 16 is less than the lower limit value, and the controller 281A may turn off the heater 14 when the temperature detected by the temperature sensor 16 is greater than the upper limit value of the set aging temperature.

When the aging time elapses, the making of the beverage by using the beverage maker may be completed.

However, in some cases, when the aging process (S900) may be omitted, and the secondary fermentation process (s800) is completed, the making of the beverage may be completed.

The controller 281A may display the completion of the making of the beverage through the display 282.

Also, the controller 281A may control the compressor 131 to maintain the temperature of the fermentation tank 112 to a temperature between an upper limit value and a lower limit value of a preset drinking temperature. When the temperature detected by the temperature sensor 16 is equal to or greater than the drinking temperature, the controller 281A may turn on the compressor of the refrigerant cycle device 13, and when the temperature detected by the temperature sensor 16 is equal to or less than the lower limit value of the drinking temperature, the controller 281A may turn off the compressor. Thus, the beverage maker may always provide cool beverage to the user.

The controller 281A may control the compressor to maintain the temperature of the fermentation tank 112 to the temperature between the upper limit value and the lower limit value of the preset drinking temperature until a beverage dispensing process (S1000) that will be described later is completed.

The beverage maker according to an implementation may further include the beverage dispensing process (S1000) of dispensing the beverage after the beverage is made.

According to an example of the beverage dispensing process (S1000), the beverage dispensing process (S1000) may include a beverage dispensing process and a dispenser cleaning process.

In the beverage dispensing process (S1000), the user may dispense the beverage by manipulating the dispenser 62.

After the beverage is completely made, when the user opens the dispenser 62, the controller 281A may open the main valve 44 and the beverage dispensing valve 64.

When the main valve 44 and the beverage dispensing valve 64 are opened, the beverage within the fermentation container 12 may flow from the fermentation container 12 to the second main channel 42 by the pressure of the air between the outer surface of the fermentation container 12 and the inner wall of the fermentation tank 112 and then flow from the second main channel 42 to the beverage dispensing channel 61 and be dispensed to the dispenser 62.

When the user closes the dispenser 62 after a portion of the beverage is dispensed through the dispenser 62, the controller 281A may close the main valve 44 and the beverage dispensing valve 64. Thus, the one-time beverage dispensing process may be completed.

Thereafter, the controller 281A may turn on the air pump 82 to open the air supply valve 159 and maintain the closing of the exhaust valve 156.

When the air pump 82 is turned on, the air injected into the air injection channel 81 may flow from the first main channel 41 to the air supply channel 154 and be supplied between the outer surface of the fermentation container 12 and the inner wall of the fermentation tank 112. The air between the outer surface of the fermentation container 12 and the inner wall of the fermentation tank 112 may press the fermentation container 12 at a pressure at which the beverage of the fermentation container 12 ascends to the second main channel 42. While the beverage is dispensed, a sufficiently high pressure may be maintained between the outer surface of the fermentation container 12 and the inner wall of the fermentation tank 112 so that the beverage is quickly dispensed.

The user may dispense the beverage at least one through the dispenser 62. That is, the beverage dispensing process may be performed at least once, and the controller 281A may determine whether the beverage is completely dispensed by using information such as a time taken to open the dispenser 62, a time taken to drive the air pump 152, and a time taken to turn on the main valve 44 after the beverage is completely made.

When the beverage is completely dispensed, the controller 281A may close the air supply valve 159. Also, when the beverage is completely dispensed, and the dispenser 62 is closed, the controller 281A may open the exhaust valve 156 for a completion set time.

When the opening of the exhaust valve 156 is controlled, the air between the outer surface of the fermentation container 12 and the inner wall of the fermentation tank 112 may be exhausted to the exhaust valve 156 through the air supply channel 154 and the exhaust channel 157, and a pressure in the space between the outer surface of the fermentation container 12 and the inner wall of the fermentation tank 112 may be equal to atmospheric pressure.

When the completion set time elapses after the exhaust valve 156 is turned on, the controller 281A may close the exhaust valve 156.

When the cleaning process (S1100) is not performed after the beverage is completely dispensed, or the cleaning process (S1100) does not include a main channel washing process that will be described later, the controller 281A may display a pack removing message for informing removal of the fermentation container 12 on the display 282. The user may open the fermentation lid 107 to take the fermentation container 12 out of the fermentation module 111.

When the fermentation lid 107 is opened as described above, if the inside of the fermentation tank 112 has a high pressure that is greater by a set pressure than the atmospheric pressure, the fermentation container 12 may be bounded upward from the fermentation tank 112 by a pressure difference.

On the other hand, before the user opens the fermentation lid 107, when a portion of the air between the fermentation container and the fermentation tank 112 is exhausted through the exhaust valve 156, the fermentation container 12 may not bounded upward but be maintained in the fermentation tank 112.

That is, the user may more safely and cleanly take the used fermentation container 12 out of the fermentation tank 112.

The dispenser cleaning process may be performed after the beverage dispensing process is performed at least once.

When a large amount of time is required until the final beverage dispensing process is completed, and the next beverage dispensing process is performed, the inside of the dispenser may be contaminated by the beverage remaining in the dispenser 62.

Thus, when the user intends to dispense the beverage after a dispenser cleaning set time elapses while the final beverage dispensing process is performed, the controller 281A may perform the dispenser cleaning process.

In more detail, when the beverage dispensing process is completed, the controller 281A may drive a timer, and when the next beverage dispensing process starts, the timer may be reset. When the dispenser cleaning set time of the timer elapses, and the dispenser 62 is opened, the controller 281A may perform the dispenser cleaning process.

Also, the controller 281A may receive a dispenser cleaning command from the input unit or the mobile terminal to perform the dispenser cleaning process.

When the dispenser cleaning process starts, the controller 281A may display cleaning notification on the display 282. The cleaning notification may include notifying the user of the dispenser 62 not to bring a cup or a glass.

An example of the dispenser cleaning process may include a water washing process and an air washing process.

When the water washing process is performed, the controller 281A may turn on the water supply pump 52. Also, the controller 281A may open the sub valve 92 and the beverage dispensing valve 64 and maintain the closing of the ingredient supply valve 310 and the bypass valve 35.

When the water supply pump 52 is turned on, the water suctioned from the water tank 51 to the water supply pump 52 may flow from the water supply channel 55B to the sub channel 91 and then pass through the sub valve 92 to flow to the beverage dispensing channel 61, pass through the beverage dispensing valve and be dispensed to the dispenser 62. While the water is dispensed to the dispenser 62, the residue and foreign substances in the dispenser 62 may be dispensed together with each other to perform the cleaning.

The water and the foreign substances dispensed to the dispenser 62 may drop down to the beverage container (see reference numeral 101 of FIG. 2).

When the water washing process starts, and an amount of accumulated water detected by the flow meter 56 reaches a water washing set flow rate, the water washing process may be completed. Here, the water washing set flow rate may be less than a cleaning set flow rate during the cleaning processes (S100 and S1100).

When the water washing process is completed, the controller 281A may turn off the water supply pump. Also, when the water washing process is completed, the controller 281A may start the air washing process.

When the air washing process starts, the controller 281A may turn on the air pump 82.

When the air pump 82 is turned on, the air injected from the air pump 82 into the first main channel 41 through the air injection channel 81 may pass through the water supply heater 53 to flow to the sub channel 91 and then pass through the sub valve 92 to flow the beverage dispensing channel 61, pass through the beverage dispensing valve 64, and be discharged to the dispenser 62. While the air is dispensed to the dispenser 62, the residual water remaining in the dispenser 62 may be dispensed together to perform the cleaning. Thus, an effect of the residual water on the taste of the beverage in the subsequent beverage dispensing process may be minimized.

When the air washing process starts, and an air washing set time elapses, the controller 281A may complete the air washing process. When the air washing process is completed, the controller 281A may turn off the air pump 82 and close the sub valve 92. Thus, the dispenser cleaning process may be completed.

When the dispenser cleaning process is completed, the controller 281A may start the beverage dispensing process again.

When the beverage of the fermentation container 12 is completely dispensed, and thus, the controller 281A determines that the beverage dispensing is completed, the controller 281A may further perform the beverage making process and the cleaning process (S1100) after the beverage dispensing.

The beverage making process and the cleaning process (S1100) after the beverage dispensing may include at least one of a first cleaning process or a second cleaning process. When the cleaning process (S1100) includes the first cleaning process and the second cleaning process, this implementation is not limited to an order of the cleaning processes.

Since the first cleaning process is equal to or similar to the above-described cleaning process (S100) before the beverage making process, duplicated descriptions will be omitted. Hereinafter, the second cleaning process will be described.

The second cleaning process may be performed in the state in which the beverage dispensing is completed, and the empty fermentation container 12 is mounted or performed after the user removes the empty fermentation container 12 to mount a separate cleaning pack on the fermentation tank 112. Hereinafter, for convenience of description, a case in which the separate cleaning pack is accommodated in the fermentation tank 112 will be described.

When the beverage of the fermentation container is completely dispensed, the controller 281A may display a replacement notification on the display 282. The user may open the fermentation lid to remove the empty fermentation container from the fermentation tank 112 and insert the separate cleaning pack into the fermentation tank 112. Thereafter, the fermentation lid 107 may be closed.

Thereafter, the controller 281A may perform the second cleaning process.

When the second cleaning process starts, the controller 281A may turn off the water supply pump 52 and the water supply heater 53 and close the beverage dispensing valve. Also, the controller 281A may turn off the ingredient supply valve 310, the bypass valve 35, and the main valve 44.

Also, when the second cleaning process starts, the controller 281A may open the gas discharge valve 73 and the exhaust valve 156. Also, the controller 281A may open the sub valve 92.

When the water supply pump 52 is turned on, water of the water tank 51 may flow to the water supply heater 53 and then be heated in the water supply heater 53.

The water (i.e. The heated water) heated by the water supply heater 53 may flow to be divided into the sub channel 91 and the first main channel 41.

The water flowing to the sub channel 91 may pass through the sub valve 92 to flow the beverage dispensing channel 61. The water flowing to the beverage dispensing channel 61 may flow to the second main channel 42 to pass through the main valve 44 and then be introduced into the cleaning pack accommodated in the fermentation tank 112.

Also, the water flowing to the first main channel 41 may flow to be divided into the ingredient supplier 3 and the bypass channel 43.

The water flowing to the ingredient supplier 3 may sequentially pass through the ingredient supply valve 310, the initial capsule mounting part 31, the intermediate capsule mounting part 32, and the final capsule mounting part 33 to flow the second main channel 42 and then pass through the main valve 44 and be introduced into the cleaning pack accommodated in the fermentation tank 112.

The water flowing to the bypass channel 43 may pass through the bypass valve 35 to flow the second main channel 42 and then pass through the main valve 44 and be introduced into the cleaning pack accommodated in the fermentation tank 112.

When controlled as described above, the main channels 41 and 42, the bypass channel 43, the sub channel 91, the valves installed in the channels, and the main channel connecting portion 115 may be sterilized and washed. Also, the capsule mounting parts 31, 32, and 33, and the connection channels 311 and 312 may be sterilized and washed.

The controller 281A may perform the cleaning during a second cleaning set time. After the second cleaning set time, the second cleaning process may be completed.

When the second cleaning set time elapses, the controller 281A may turn off the water supply pump 52 and the water supply heater 53 to close all of the main valve 44, the bypass valve 35, the ingredient supply valve 310, the sub valve 92, the gas discharge valve 73, and the exhaust valve 156.

After the cleaning process (S1100) is completed, the user may open the fermentation lid 107 and take the cleaning pack containing the water used for the washing out of the fermentation tank 112.

Figure 5:
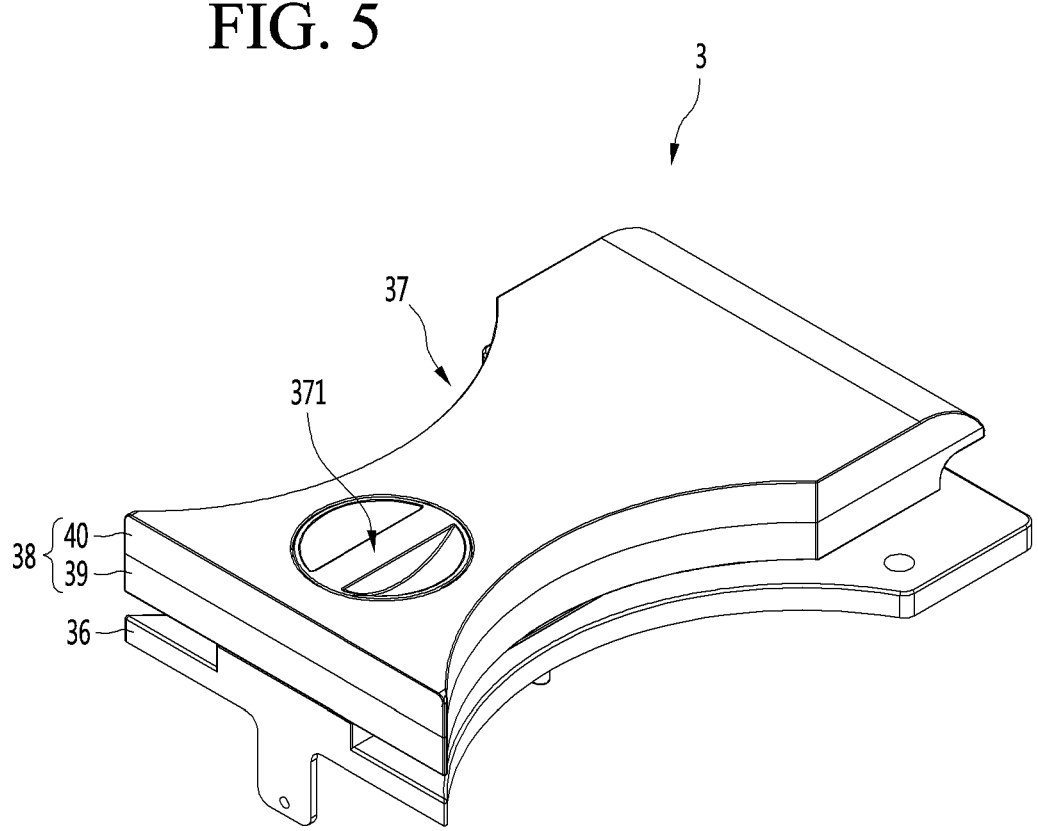
FIG. 5 is a perspective view illustrating an example ingredient supplier that is sealed.
Figure 6:
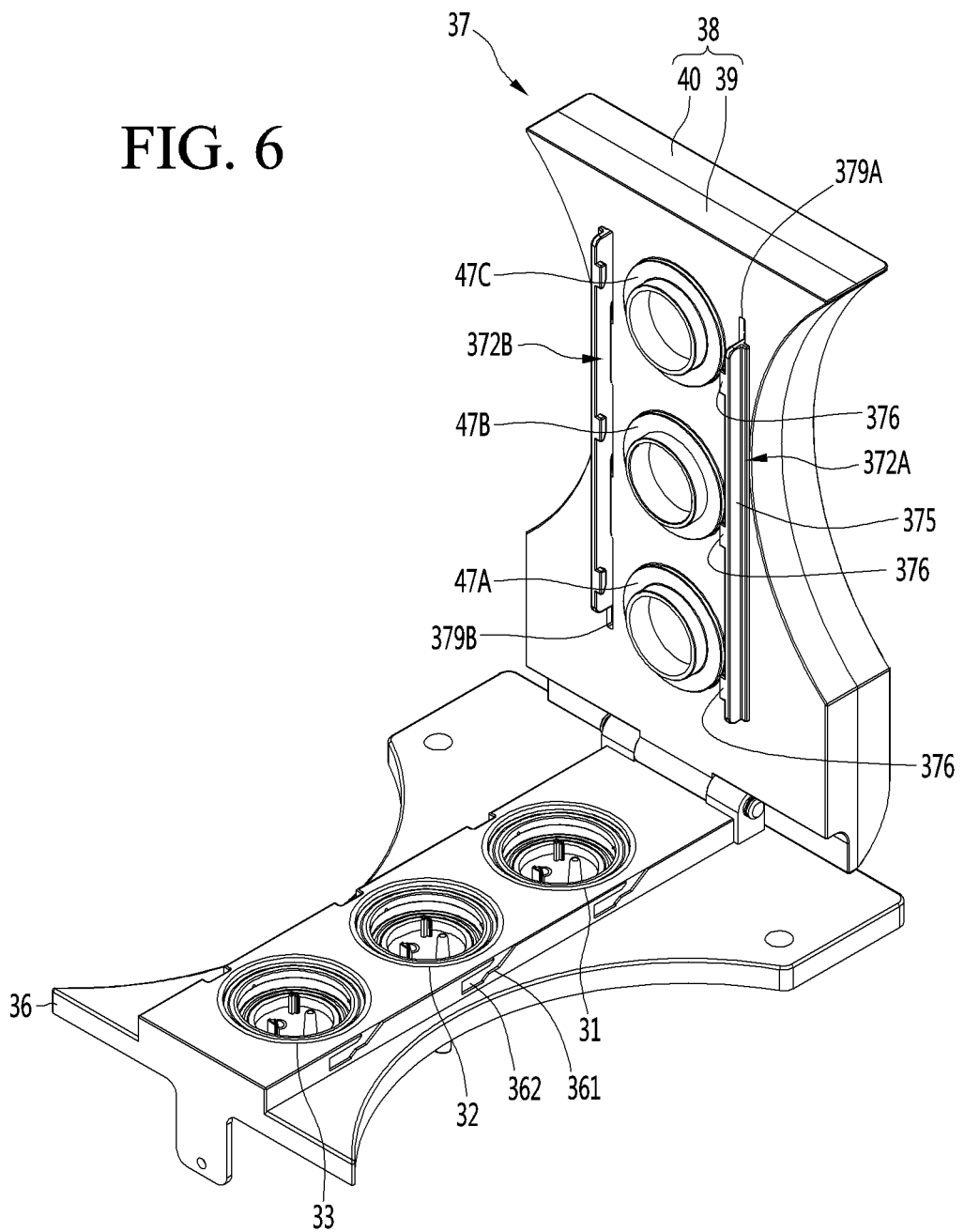
FIG. 6 is a perspective view illustrating an example ingredient supplier that is opened.

FIG. 5 is a perspective view illustrating an example ingredient supplier that is sealed according to an implementation, and FIG. 6 is a perspective view illustrating a state in which the ingredient supplier that is opened.

The above-described capsules C1, C2, and C3 may be merely an example. Hereinafter, an ingredient containers C1, C2, and C3, which are named instead of the capsules, will be described. Also, the ingredient holder may be named as container mounting parts 31, 32, and 33.

The ingredient supplier 3 may include an ingredient accommodating body 36 on which container mounting parts 31, 32, and 33, on which ingredient containers C1, C2, and C3 are detachably mounted, are disposed and a lid module 37 covering the container mounting parts 31, 32, and 33.

Since the ingredient containers are accommodated in the ingredient supplier 3, an ingredient accommodating body 36 may be defined as an ingredient container accommodating body.

The lid module 37 may include a lid 38 covering the ingredient accommodating body and a locking manipulation part releasing locking of the lid 38. The lid 38 may be rotatably connected or slidably disposed on the ingredient accommodating body. The lid 38 may be hinge-coupled to the ingredient accommodation body 36.

The lid 38 may be provided as an assembly of a plurality of members. For example, the lid 38 may include a lower lid 39 and an upper lid 40. At least one of the lower lid or the upper lid 40 may be connected to the ingredient accommodation body 36.

When the user pushes the locking manipulation part 371, the locking of the lid 38 may be released. As the lid 38 is unlocked, the lid 38 hinge-coupled to the ingredient accommodation body 36 may rotate to the upper side of the ingredient accommodation body 36. When the lid rotates upward, the container mounting parts 31, 32, and 33 provided in the ingredient accommodation body 36 may be opened to the outside.

The container mounting parts 31, 32, and 33 in which ingredient containers C1, C2, and C3, in which beverage ingredients are accommodated, are separably accommodated may be provided in the ingredient accommodating body 36 of the ingredient supplier 3. This implementation is not limited to the number of container mounting parts 31, 32, and 33. For example, at least one container mounting part may be provided.

The plurality of container mounting parts 31, 32, and 33 may be disposed in the ingredient accommodating body 36 in a line. The plurality of container mounting parts 31, 32, and 33 may be disposed to be spaced apart from each other in a front and rear direction or a left and right direction. The beverage maker have a slim shape in the left and right direction. The ingredient supplier 3 may be lengthily disposed in the front and rear direction. The plurality of container mounting parts 31, 32, and 33 may be disposed to be spaced apart from each other in the front and rear direction of the ingredient accommodating body 36.

The lid module 37 may include lockers 372A and 372B for locking the lid 38. Also, a support groove by which the lockers 372A and 372*b* are supported and a hook groove 362 hooked with the lockers 372A and 372B may be defined in the ingredient accommodating body 36.

The lockers 372A and 372B may be provided in the lid module 37 to move forward and backward. At least one locking part 376 may be disposed on the lockers 372A and 372B. The locking part 376 may be supported by the support groove 361 and hooked with the hook groove 362.

The support groove 361 and the hook groove 362 may communicate with each other, and the locking part 376 may be movable from the support groove 361 to the hook groove 362. The support groove 361 and the hook groove 362 may be stepped with respect to each other.

The support groove 361 may be disposed at a position higher than that of the hook groove 362 with respect to a top surface of the ingredient accommodating body 36. Thus, when the locking part 376 moves from the support groove 361 to the hook groove 362, the lid module 37 may move downward.

In more detail, when the lid module is closed but in an unlocked state, the lockers 372A and 372B may be supported by the support groove 361. In this state, when a user allow the locking manipulation part 371 to rotate in one direction (for example, a clockwise direction), the lid module 37 may be locked to move downward.

When the lid module is closed and in a clocked state, the lockers 372A and 372B may be hooked to be fixed to the hook groove 362. Thus, the container mounting parts 31, 32, and 33 may be prevented from being opened due to arbitrary rotation of the lid 38. In this state, when a user allow the locking manipulation part 371 to rotate in an opposite direction (for example, a counterclockwise direction), the locking of the lid module 37 may be released, and the lid module 37 may move upward.

Figure 7:
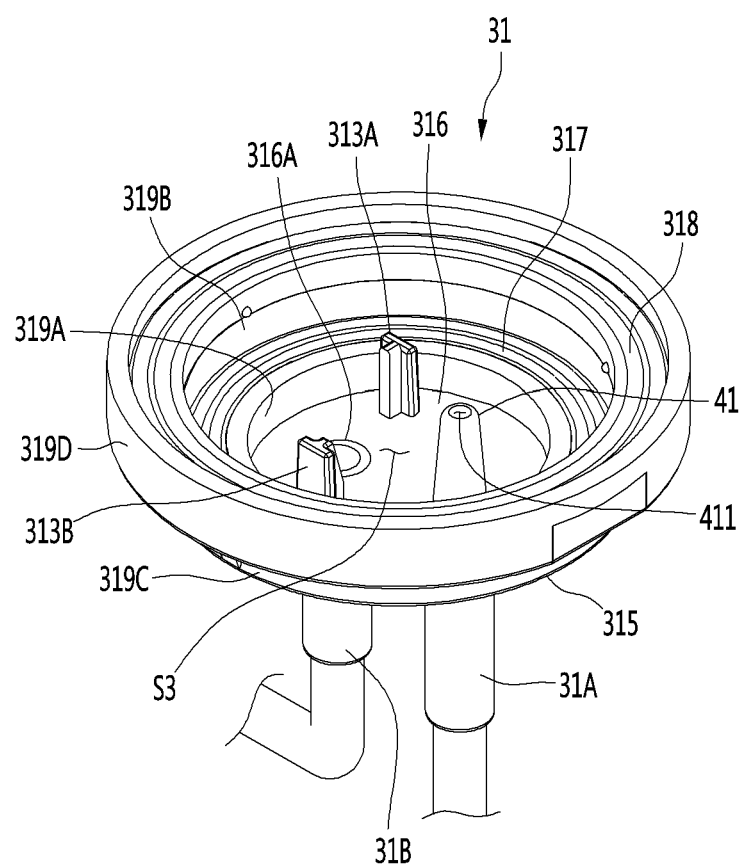
FIG. 7 is a perspective view illustrating an example accommodating part provided in an example ingredient supplier.
Figure 8:
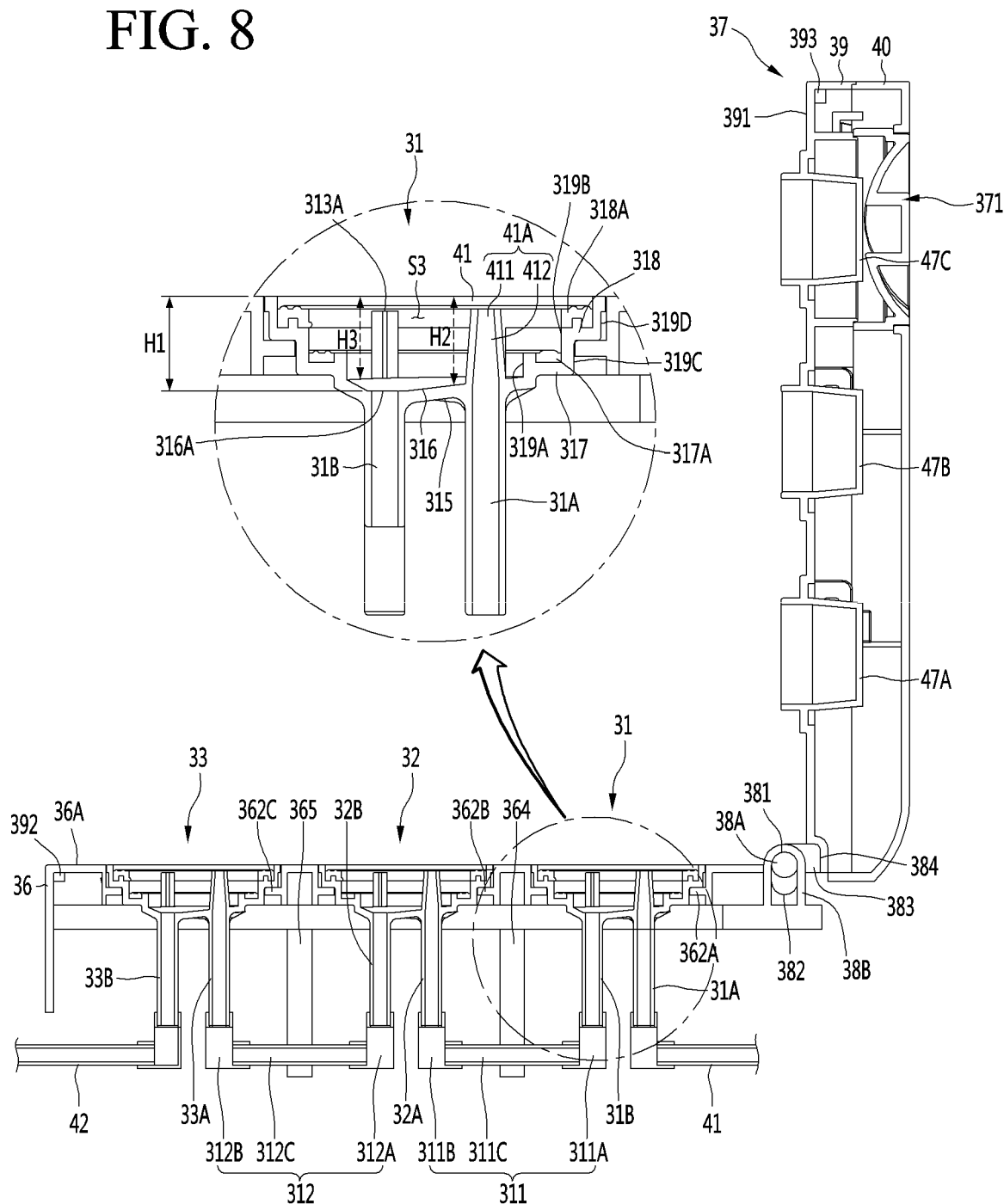
FIG. 8 is a view illustrating an example ingredient supplier before an ingredient container is seated on the example ingredient supplier.
Figure 9:
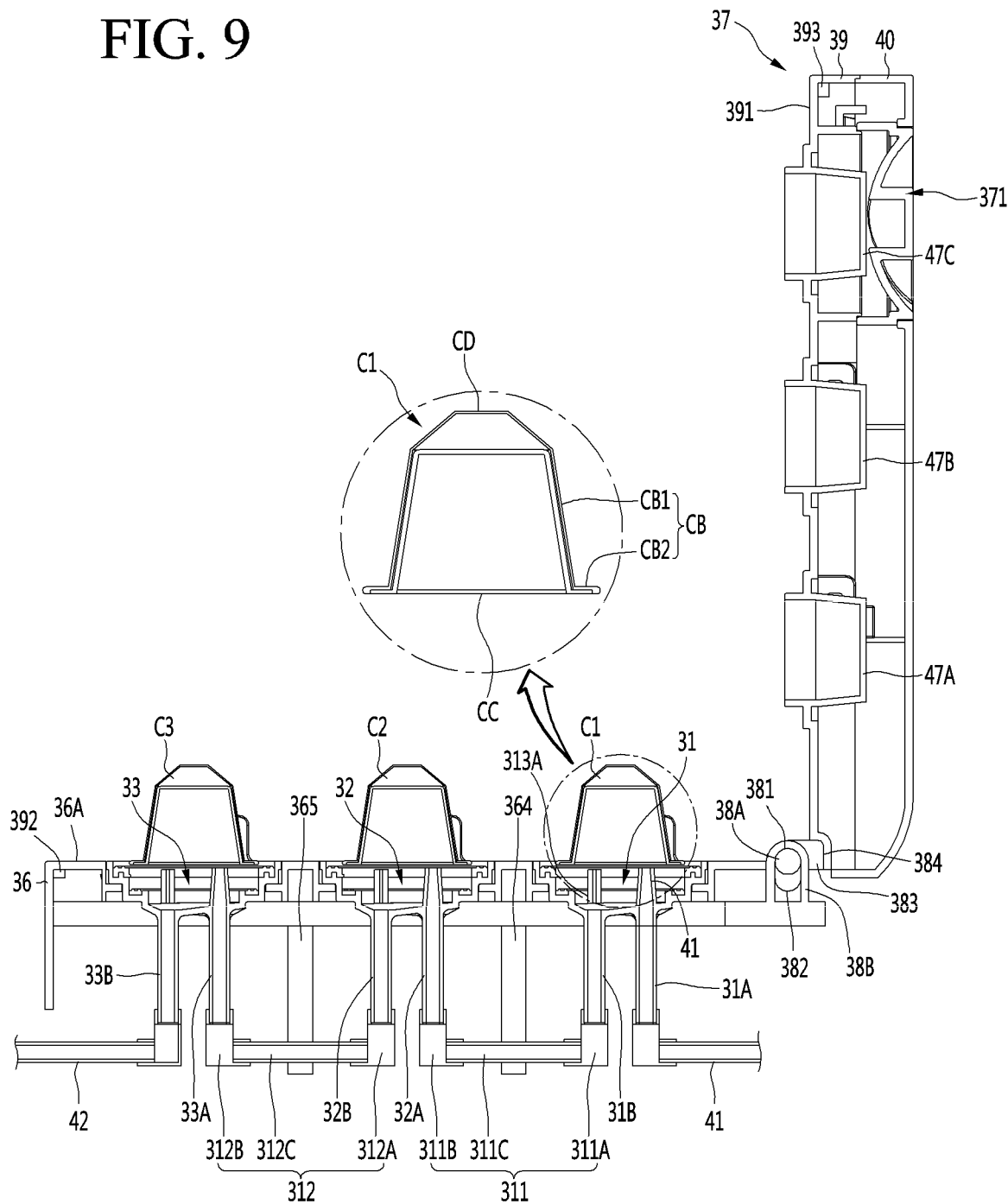
FIG. 9 is a perspective view illustrating an example ingredient supplier in a state in which an ingredient container is seated on the ingredient supplier.
Figure 10:
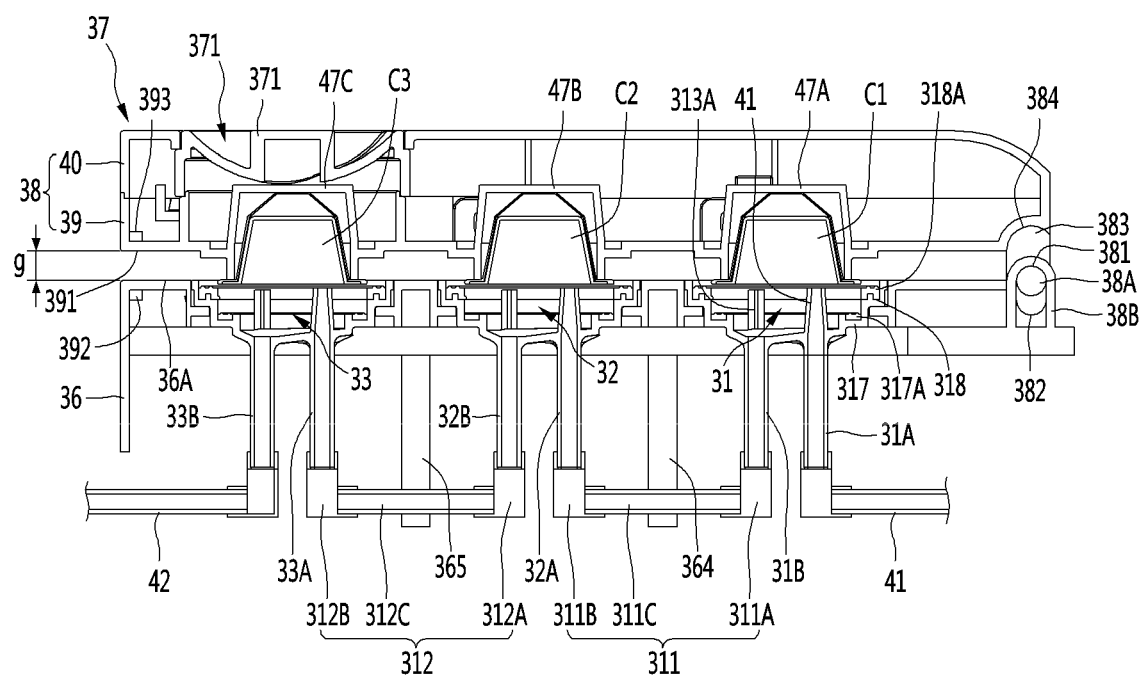
FIG. 10 is a view illustrating an example ingredient container seated on an example ingredient supplier when an example lid module is closed and in an unlocked state.
Figure 11:
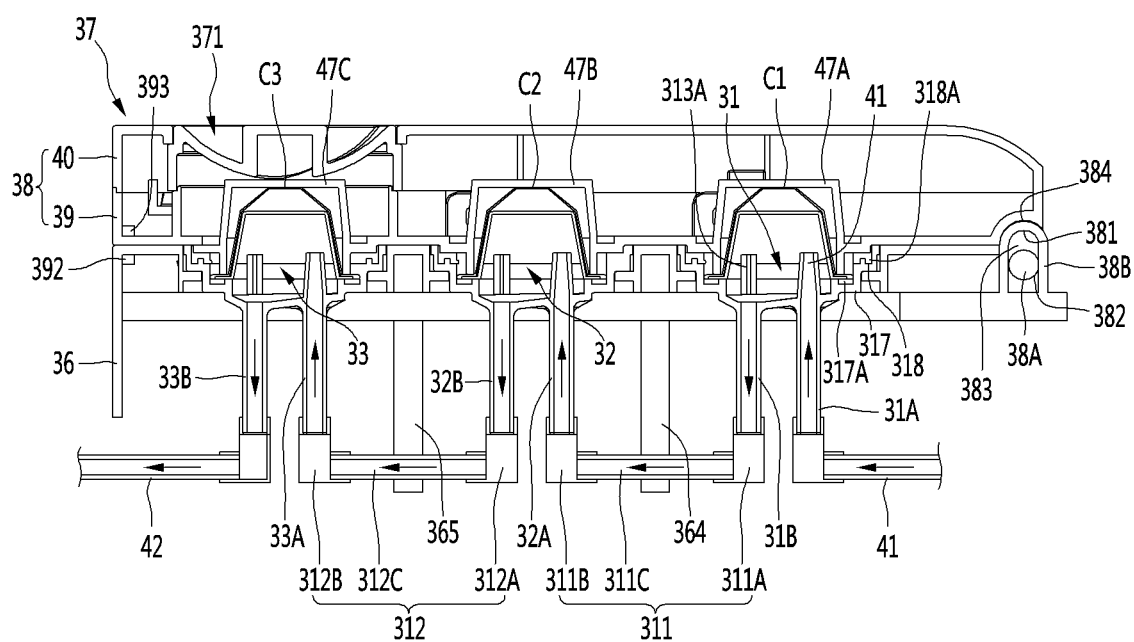
FIG. 11 is a view illustrating an example ingredient container seated on an example ingredient supplier when an example lid module is closed and in a locked state.

FIG. 7 is a perspective view illustrating an example of an accommodating part provided in an example ingredient supplier, FIG. 8 is a view illustrating an example ingredient supplier before the ingredient container is seated on the ingredient supplier, FIG. 9 is a perspective view illustrating an example ingredient supplier in a state in which the ingredient container is seated on the ingredient supplier, FIG. 10 is a view illustrating an example ingredient container seated on an example ingredient supplier when the lid module is closed and in an unlocked state, and FIG. 11 is a view illustrating an example ingredient container seated on an example ingredient supplier when the lid module is closed and in a locked state.

Although an initial container mounting part 31 is illustrated in FIG. 7, it is obvious for those skilled in the art that the configuration of the intermediate container mounting part 32 and the final container mounting part 33 may be easily grasped from this configuration.

Hereinafter, a case in which three container mounting parts 31, 32, and 33 are provided in the ingredient supplier 3 will be described as an example.

The container mounting parts 31, 32, and 33 may be provided in accommodating spaces defined by a bottom surface 316 and inner circumferential surfaces 319A and 319B, respectively. Beverage ingredients or the ingredient containers C1, C2, and C3 may be accommodated in the accommodating spaces, respectively.

As described above, the initial container mounting part 31 may be connected to a first main channel 41 through an inlet 31A and be connected to a first connection channel 311 through an outlet 31B. As described above, the intermediate container mounting part 32 may be connected to the first connection channel 311 through an inlet 32A and be connected to a second connection channel 312 through an outlet 32B. The final container mounting part 33 may be connected to the second connection channel 312 through an inlet 33A and be connected to a second main channel 42 through an outlet 33B.

The inlets 31A, 32A, and 33A and the outlet 31B, 32B, and 33B may protrude from bottom surfaces 315 of the container mounting parts 31, 32, and 33 in the opposite direction of the accommodating spaces S3.

The ingredient supplier 3 may supply a fluid into the accommodating spaces S3 within the container mounting parts 31, 32, and 33 through the inlets 31A, 32A, and 33A or may supply the fluid into the ingredient containers C1, C2, and C3 mounted in the accommodating spaces S3.

The container mounting parts 31, 32, and 33 may include a first main channel 41 connected to the inlets 31A, 32A, and 33A to supply the fluid into the accommodating spaces S3 or the ingredient container C1.

The first main channel 41 may protrude from one surface (for example, the bottom surface 316) of each of the container mounting parts 31, 32, and 33 to the accommodating spaces S3. In this case, when the ingredient containers C1, C2, and C3 are accommodated in the accommodating spaces S3, and the lid module 37 covers the container mounting parts 31, 32, and 33, the first main channel 41 may punch an ingredient container cover (see reference symbol CC of FIG. 9) of the ingredient containers C1, C2, and C3, and a portion of the first main channel 41 may enter into the ingredient containers C1, C2, and C3.

That is, when the lid module 37 covers the container mounting part 31, at least a portion of the first main channel 41 may have a height that is disposed in each of the ingredient containers C1, C2, and C3.

A discharge hole 316A communicating with each of the outlets 31B, 32B, and 33B may be defined in the one surface (for example, the bottom surface 316) of each of the container mounting parts 31, 32, and 33.

At least one punching parts 313A and 313B may be further provided in the one surface (for example, the bottom surface 316) of the container mounting part 31. Each of the punching parts 313A and 313B may be adjacent to the discharge hole 316A. Thus, the ingredients extracted through a hole defined by each of the punching parts 313A and 313B may easily move to the discharge hole 316A.

The punching parts 313A and 313B may include a first punching part 313A and a second punching part 313B disposed at an opposite side of the first punching part 313A with respect to the discharge hole 316A. The first punching part 313A and the second punching part 313B may be spaced apart from each other. That is, the discharge hole 316A may be disposed between the first punching part 313A and the second punching part 313B. Thus, the ingredients contained in the ingredient containers C1, C2, and C3 may be extracted without remaining to more easily move to the discharge hole 316A.

The first main channel 41, the punching parts 313A and 313B, and the discharge hole 316A may be disposed at eccentric positions from centers of the container mounting parts 31, 32, and 33. Also, the first main channel 41, the punching parts 313A and 313B, and the discharge hole 316A may be spaced apart from each other. Thus, a contact time between the fluid and the ingredients may increase, and an amount of ingredients mixed with the fluid may increase. As result, an amount of ingredients to be extracted may also increase.

Also, since the first main channel 41 and the punching parts 313A and 313B are provided on the same surface (for example, the bottom surface 316) of the container mounting part 31, a passage between the first main channel 41 and each of the punching parts 313A and 313B may be more simplified. In this case, the passage may have low resistance, and thus, the ingredients within the container mounting part 31 may be more easily extracted.

An inner supply channel (see reference numeral 41A of FIG. 8) may be provided in the first main channel 41. The inner supply channel 41A may include an inner passage 412 provided in the first main channel 41 and at least one hole 411 through which a fluid of the inner passage 412 is supplied to the accommodating spaces S3. The inner supply channel 41A may communicate with the inlets 31A, 32A, and 33A. The fluid passing through the inlets 31A, 32A, and 33A may be guided to the accommodating spaces S3 or into the ingredient containers C1, C2, and C3 through the inner supply channel 41A of the first main channel 41.

The at least one hole 411 may be defined closer to an upper end than a lower end (or the bottom surface of the container mounting part 31) of the first main channel 41. The hole 411 may be defined in the upper end of the first main channel 41.

The at least one hole 411 may be defined at a height that is disposed in each of the ingredient containers C1, C2, and C3 when the ingredient containers C1, C2, and C3 are accommodated in the container mounting parts 31, 32, and 33. Thus, the fluid may be guided to the inside of the ingredient containers C1, C2, and C3 through the at least one hole 411.

As described above, the container mounting parts 31, 32, and 33 may include punching parts 313A and 313B that punch the ingredient container cover CC of the ingredient containers C1, C2, and C3. The punching parts 313A and 313B may be installed to protrude from the bottom surface 316 of the container mounting part 31 to the accommodating space S3. When the ingredient containers C1, C2, and C3 are mounted, the ingredient containers C1, C2, and C3 may be inserted into (or seated on the container mounting part 31) the container mounting parts 31, 32, and 33 at upper positions of the container mounting parts 31, 32, and 33.

The ingredient container cover CC of the ingredient containers C1, C2, and C3 may be punched by the first main channel 41. As a result, the fluid may be introduced from the inner supply channel 41A of the first main channel 41 to the ingredient containers C1, C2, and C3.

Also, the ingredient container cover CC of the ingredient containers C1, C2, and C3 may be cut by the punching parts 313A and 313B of the container mounting parts 31 and 33. As a result, punched holes through which the ingredients are discharged may be defined in the ingredient container cover CC of the ingredient containers C1, S2, and C3.

The ingredients accommodated in the ingredient containers C1, C2, and C3 may be extracted through gaps between the punching parts 313A and 313B and the punched holes or extracted through gaps between the first main channel 41 and the punched holes. Particularly, each of the punching parts 313A and 313B may have a shape for widening an area of the gap.

The ingredients extracted from the ingredient containers C1, C2, and C3 may flow to the second main channel 42 through the discharge hole 316A defined in each of the container mounting parts 31, 32, and 33 and the outlets 31B, 32B, and 33B communicating with the discharge hole 316A.

The bottom surface 316 of each of the container mounting parts 31, 32, and 33 may be inclined at a predetermined angle with respect to a horizontal direction so that the ingredients extracted through the gap between the first main channel 41 and each of the punched holes smoothly move. Particularly, the bottom surface 316 may have an inclination that gradually decreases from the first main channel 41 to the discharge hole 316A. Thus, the ingredients extracted from the ingredient containers C1, C2, and C3 may smoothly move to the discharge hole 316A.

In more detail, a height H1 from an upper space S3 of the accommodating space S3 to the discharge hole 316A may be greater than a height H2 from the upper end of the accommodating space S3 to a lower end of the first main channel 41. Also, the height H1 from an upper space S3 of the accommodating space S3 to the discharge hole 316A may be greater than a height H3 from the upper end of the accommodating space S3 to a lower end of each of the punching parts 313A and 313B.

As described above, the container mounting parts 31, 32, and 33 may include the outlets 31B, 32B, and 33B through which the ingredients or water and a mixture of the ingredients and the water are guided.

Each of the outlets 31B, 32B, and 33B may protrude downward from the container mounting parts 31, 32, and 33. An extraction channel for guiding the ingredients or the water and the mixture of the ingredients and the water may be provided in each of the outlets 31B, 32B, and 33B.

The ingredient containers C1, C2, and C3 may be seated on the container mounting parts 31, 32, and 33. Also, when the lid 38 covers the container mounting parts 31, 32, and 33 and is in a locked state, an ingredient container stopper 317 contacting a seating surface of each of the ingredient containers C1, C2, and C3 and a contact part 318 contacting pressing parts 47A, 47B, and 47C of the lid 38 may be further provided on the container mounting parts 31, 32, and 33. The ingredient container stopper 317 and the contact part 318 will be described later in more detail.

The ingredient accommodating body 36 may be provided with at least container mounting part 31, 32, and 33. The ingredient accommodating body 36 may include housings 362A, 362B, and 363C provided to protect outer circumferences of the container mounting parts 31, 32, and 33. At least a portion of each of the container mounting parts 31, 32, and 33 may be accommodated into the housings 362A, 362B, and 362C. In this case, outer circumferential surfaces 319C and 319D of the container mounting part 31 may contact the housing 362A.

A through-hole through which each of the inlets 31A, 32A, and 32A and the outlets 31B, 32B, and 33B passes may be defined in the ingredient accommodating body 36. The housings 362A, 362B, and 362C and the through-hole may fix the container mounting parts 31, 32, and 33 to the ingredient accommodating body 36 to prevent the container mounting parts 31, 32, and 33 from being separated.

Each of the container mounting parts 31, 32, and 33 may be opened or closed together with each other by the lid module 37. The sum of the areas of the plurality of container mounting parts 31, 32, and 33 may be less than an area of the lid module 37.

The ingredient supplier 3 may include the lid module for each container mounting part. That is, in the ingredient supplier 3, one container mounting part may be opened and closed by one lid module. In this case, when three container mounting parts are disposed on the ingredient supplier 3, three lid modules that independently rotate with respect to each other may be provided on the ingredient accommodating body 36. However, when the plurality of lid modules are installed on the ingredient accommodating body 36, the number of components of the ingredient supplier 3 may increase, and thus, the mounting and separation of a plurality of ingredient containers may be troublesome.

When one lid module 37 opens and closes all of the plurality of container mounting parts 31, 32, and 33, the number of components may decrease, and the structure may be simplified. Thus, the user may easily handle the ingredient supplier. The user may open all of the plurality of container mounting parts 31, 32, and 33 through a simple operation, i.e., through upward rotation. Also, the user may cover all of the plurality of container mounting parts 31, 32, and 33 through a simple operation, for example, by downward rotation.

The lid 38 may be provided as an assembly of a plurality of members. For example, the lid 38 may include a lower lid 39 and an upper lid 40. The lower lid 39 and the upper lid 40 may be connected to the ingredient accommodation body 36.

The upper lid 40 may be coupled to the lower lid 39 to cover an opened top surface of the lower lid 39.

When the lid 38 covers the container mounting parts 31, 32, and 33, the pressing parts 47A, 47B, and 47C pressing the ingredient containers C1, C2, and C3 to the bottom surface 316 may be disposed on the lower lid 39. The pressing parts 47A, 47B, and 47C may protrude downward from the lid module 37, more particularly, the bottom surface 391 of the lower lid 39.

The lid module 37 may be coupled to the ingredient accommodation body 36 through hinges 38A and 38B.

In more detail, a rear end of the ingredient accommodating body 36 and a rear end of the lid module 37 may be connected to each other through the hinges 38A and 38B.

A hinge shaft 38A may be disposed on one of the lid module 37 or the ingredient accommodating body 36. The hinge shaft 38A may be horizontally disposed with respect to one of the lid module 37 or the ingredient accommodating body 36. A hinge shaft connection part 38B rotatably supported by the hinge shaft 38A may be disposed on the other one of the lid module 37 or the ingredient accommodating body 36.

Hereinafter, for convenience of description, a case in which the hinge shaft 38A may be disposed on the lid module 37, and the hinge shaft connecting portion 38B are disposed on the ingredient accommodating body 36 will be described as an example.

The hinge shaft connecting portion 38B may have a size less than that of the hinge shaft 38A so that the hinge shaft 38A is movable within the hinge shaft connecting portion 38B. The hinge shaft 38A may move between a first position and a second position within the hinge haft connecting portion 38N. When the lid module 37 is opened and in an unlocked state, the hinge shaft 38A may be disposed at the first position, and when the lid module 37 is in the locked state, the hinge shaft 38A may be disposed at the second position.

For example, the hinge shaft connecting portion 38B may be lengthily disposed in the vertical direction when compared to the hinge shaft 38A so that the hinge shaft 38A is movable in the vertical direction. The hinge shaft 38A may be vertically movable between an upper inner circumferential surface 381 of an upper portion of the hinge shaft connecting portion 38B and an inner circumferential surface 382 of a lower portion of the hinge shaft connecting portion 38B.

The lid module 37 may rotate with respect to the hinge shaft 38A. Also, the lid module 37 may be vertically movable together with the hinge shaft 38A.

The lid module 37 may further include a connecting portion 38B connecting the lid 38, more particularly, a lower lid 39 to the hinge shaft 38A.

The connecting portion 38B may have one side connected to the hinge shaft 38A and the other side connected to the lower lid 39.

When the lid module 37 is closed and in the locked state, a bottom surface 391 of the lid module 37 and a top surface 36A of the ingredient accommodating body 36 may be spaced apart from each other by the connecting portion 38B. That is, a gap g having a predetermined height may be provided between the bottom surface 391 of the lid module 37 and the top surface 36A of the ingredient accommodating body 36.

In the connecting portion 38B, when the lid module 37 is closed and in the unlocked state, the connecting portion 38B may contact the upper inner circumferential surface 381 of the hinge shaft connecting portion 38B, and when the lid module 37 is locked, the hinge shaft 38A may have a length that is enough to contact the lower inner circumferential surface 383 of the hinge shaft connecting portion 38B.

A recess part 384 contacting the hinge shaft connecting portion 38B may be provided in the lower lid 39. A bottom surface of the lower lid 39 may be upward recessed to form the recess part 384.

The recess part 384 may have a curved shape corresponding to an upper outer circumferential surface of the hinge shaft connecting portion 38B. The recess part 384 may face the hinge shaft connecting portion 38B in the vertical direction.

When the lid module 37 is in the locked state, the upper outer circumferential surface of the hinge shaft connecting portion 38B may contact the recess part 384. When the lid module 37 is in unlocked state, the upper outer circumferential surface of the hinge shaft connecting portion 38B may be vertically spaced apart from the recess part 384.

The hinge shaft connecting portion 38B that is lengthily disposed in the vertical direction may be prevented from interfering with the lower lid 39 by the recess part 384.

Referring to FIG. 9, the ingredient containers C1, C2, and C3 may be seated on the container mounting parts 31, 32, and 33, respectively.

The ingredient containers C1, C2, and C3 may include an ingredient container body CB, an ingredient container cover CC, and a pressing contact part CD. The ingredient container body CB, the ingredient container cover CC, and the pressing contact part CD may seal the inside of the ingredient containers C1, C2, and C3 from the outside to prevent the beverage ingredients accommodated in the ingredient containers C1, C2, and C3 from being deformed or protect the beverage ingredients prevent the beverage ingredients from leaking to the outside.

The ingredient container body CB may define a side surface of the ingredient container C1. The ingredient container body CB may be made of a plastic material such as polypropylene (PP), polyethylene terephthalate (PET), and the like to effectively protect the inside of the capsule, thereby preventing the capsule from being damaged or broken down by a predetermined impact. In some implementations, the ingredient container body CB may be made of aluminum.

The ingredient container body CB may include an ingredient container cover bonding part CB2 to which the ingredient container cover CC is bonded and a body part CB1 connected to the ingredient container cover bonding part CB2 to define the side surface of the ingredient container C1.

The ingredient container cover bonding part CB2 may have a predetermined length in a radial direction to allow the ingredient container cover CC to be effectively bonded thereto.

For example, the ingredient container cover bonding part CB2 may have an outer diameter greater than that of the body part CB1 to prevent the ingredients within the ingredient containers C1, C2, and C3 from remaining on the ingredient container cover bonding part CB2 and to allow the pressing parts 47A, 47B, and 47C to effectively press the ingredient container cover bonding part CB2.

The body part CB1 may have a width that gradually decreases from the ingredient container cover CC to the pressing contact part CD. For example, the body part CB1 may have a cylindrical shape of which a width of an outer diameter and an inner diameter gradually decreases from the ingredient container cover CC to the pressing contact part CD. However, this implementation is not limited thereto.

The ingredient container cover CC may be made of a material that is capable of being easily cut by the punching parts 313A and 313B of the ingredient supplier 3 and the first main channel 41. For example, the ingredient container cover CC may be made of a soft material such as aluminum foil or a polyethylene (PE) film. The ingredient container cover CC may have strength less than that of the ingredient container body CB. In this case, when the ingredient container cover CC is cut by the punching parts 313A and 313B and the first main channel 41, the ingredient container cover CC may extend up to portions of the ingredient container cover CC, which contact the punching part 313A and 313B and the first main channel 41, as well as portions of the ingredient container cover CC, which are adjacent to the contact portions. Also, when the ingredients are extracted by the fluid supplied into the ingredient containers C1, C2, and C3, the cut area of the ingredient container cover CC may be more widened by the pressure. As a result, the ingredients may be more easily discharged through the cut portions (punched portions) of the ingredient container cover CC.

When the lid module 37 covers the container mounting parts 31, 32, and 33 and is in the locked state, the pressing contact part CD may contact the pressing parts 47A, 47B, and 47C of the lid module 37 and be pressed toward the ingredient accommodating body 36.

Since at least one of the pressing contact part CD or the ingredient container cover bonding part CB2 is pressed by the pressing parts 47A, 47B, and 47C, the ingredient containers C1, C2, and C3 may move toward the container mounting parts 31, 32, and 33, and the ingredient container cover CC may be punched by the punching parts 313A and 313b and the first main channel 41.

The pressing contact part CD may be made of the same material as the ingredient container body CD.

The ingredients for making the beverage may be accommodated in the ingredient container C1, C2, and C3. The ingredients accommodated in the ingredient containers C1, C2, and C3 may be provided in a liquid or powder state.

Referring to FIGS. 10 and 11, after the ingredient containers C1, C2, and C3 are seated on the container mounting parts 31, 32, and 33, the user may allow the lid module 37 to rotate with respect to the hinge shaft 38A, thereby covering the container mounting parts 31, 32, and 33 and the ingredient containers C1, C2, and C3 by using the lid module 37.

Here, the hinge shaft 38A may rotate in the state of contacting the upper inner circumferential surface 381 of the hinge shaft connecting portion 38B and prevent the lid module 37 and the ingredient accommodating body 36 from interfering with each other.

When the lid module is closed and in the unlocked state, the bottom surface 391 of the lid module 37 and the top surface 36A of the ingredient accommodating body 36 may be spaced apart from each other, and the ingredient containers C1, C2, and C3 may not be punched in the state of being placed on the punching part 313A and 313B and the first main channel 41. Also, the hinge shaft 38A may be in the state of contacting the upper inner circumferential surface of the hinge shaft connecting portion 38B.

When the user allows the locking manipulation part 371 of the lid module 37 to rotate in the locking direction, the lid module 37 may descend, and the ingredient accommodating body 36 may be locked. A details and operation of the locking manipulation part 371 will be described later in detail.

When the lid module 37 is locked, the lid module 37 may move to the ingredient accommodating body 36, and the pressing parts 47A, 47B, and 47C of the lid 38 may press at least one of the pressing contact part CD of each of the ingredient containers C1, C2, and C3 or the ingredient container cover bonding part CB2 downward.

The ingredient containers C1, C2, and C3 may descend by the pressing. Here, the seating surface including the ingredient container cover CC of the ingredient containers C1, C2, and C3 may contact the ingredient container stopper 317 of the container mounting parts 31, 32, and 33 and may not descend any more, and the ingredient container cover CC may be cut by the punching part 313A and 313B provided on each of the container mounting parts 31, 32, and 33 and the first main channel 41.

For this, a height up to the ingredient container stopper 317 may be less than that up to the upper end of each of the punching parts 313A and 313B and the first main channel 41 with respect to the base (see reference numeral 100 of FIG. 3).

Also, at least one hole 411 of the first main channel 41 may be defined at a position higher than the ingredient container stopper 317 from the base 100. Also, when the ingredient containers C1, C2, and C3 contact the ingredient container stopper 317 and thus may not move any more, the at least one hole 411 may be disposed inside the ingredient containers C1, C2, and C3.

When the lid module is locked, the hinge shaft 38A may descend together with the lid module 37 to contact the lower inner circumferential surface 382 of the hinge shaft connecting portion 38B. Also, the bottom surface 391 of the lid module 37 and the top surface 36A of the ingredient accommodating body 36 may contact each other.

After the ingredient container cover CC is cut, the fluid may be introduced through the first main channel 41, and the introduced fluid may be guided to the inside of the each of the ingredient containers C1, C2, and C3. The fluid guided to the inside of each of the ingredient containers C1, C2, and C3 may be extracted to the outlets 31B, 32B, and 33B together with the beverage ingredients within the ingredient containers C1, C2, and C3 through the portions punched by the punching parts 313A and 313B.

An ingredient container sealing part 317A may be disposed on the top surface of the ingredient container stopper 317. When the ingredient containers C1, C2, and C3 are seated on the ingredient container stopper 317, and the fluid is supplied so that the ingredients within the ingredient containers C1, C2, and C3 are extracted, the ingredient container sealing part 317A may seal a gap between the ingredient container stopper 317 and each of the ingredient containers C1, C2, and C3 to prevent the ingredients from leaking through the gap. Thus, the ingredient supplier 3 may be maintained in the clean state.

Also, a pressing sealing part 318A may be disposed on a top surface of the pressing contact part 318. When the ingredients leak through the gap between each of the ingredient containers C1, C2, and C3 and the ingredient container stopper 317 even though the ingredient container sealing part 317A is provided, the pressing sealing part 318A may prevent the leaking ingredients from leaking to the outside of the container mounting parts 31, 32, and 33. Thus, the clean state of the ingredient supplier 3 may be more effectively maintained.

However, the pressing sealing part 318A may not be provided on the pressing contact part 318, and the sealing may be provided on the pressing parts 47A, 47B, and 47C. The sealing may be provided to surround the lower outer circumference of each of the pressing parts 47A, 47B, and 47C and contact the inner circumference of each of the container mounting parts 31, 32, and 33. Thus, the leaking of the ingredients between the pressing parts 47A, 47B, and 47C and the container mounting parts 31, 32, and 33 may be prevented.

A first magnetic body 392 may be disposed on the ingredient accommodating body 36, and a second magnetic body 393 that generates repulsive force with respect to the first magnetic body 392 may be disposed on the lid module 37.

The first magnetic body 392 may be disposed at a front side of the container mounting parts 31, 32, and 33, and the second magnetic body 393 may be disposed at a front side of the pressing parts 47A and 47B. When the lid module is closed, the first magnetic body 392 and the second magnetic body 393 may face each other in the vertical direction.

At least one of the first magnetic body 392 or the second magnetic body 393 may include a magnet.

The first and second magnetic bodies 392 and 393 may exert the repulsive force with each other, the lid module 37 may be more easily unlocked. Also, when the lid module 37 is in the unlocked state, the gap g between the bottom surface 391 of the lid module 37 and the top surface 39A of the ingredient accommodating body 36 may be more easily maintained.

Figure 12:
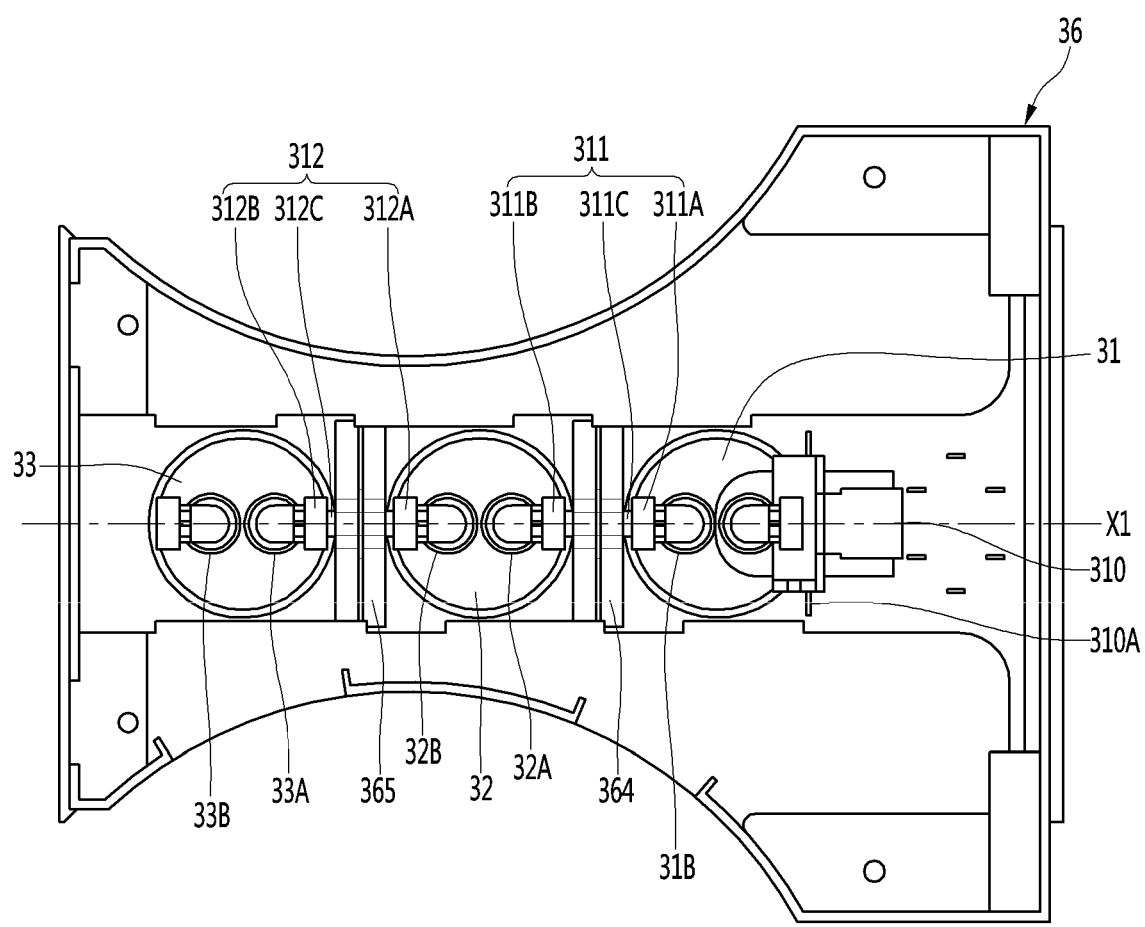
FIG. 12 is a bottom view illustrating an example ingredient supplier.
Figure 13:
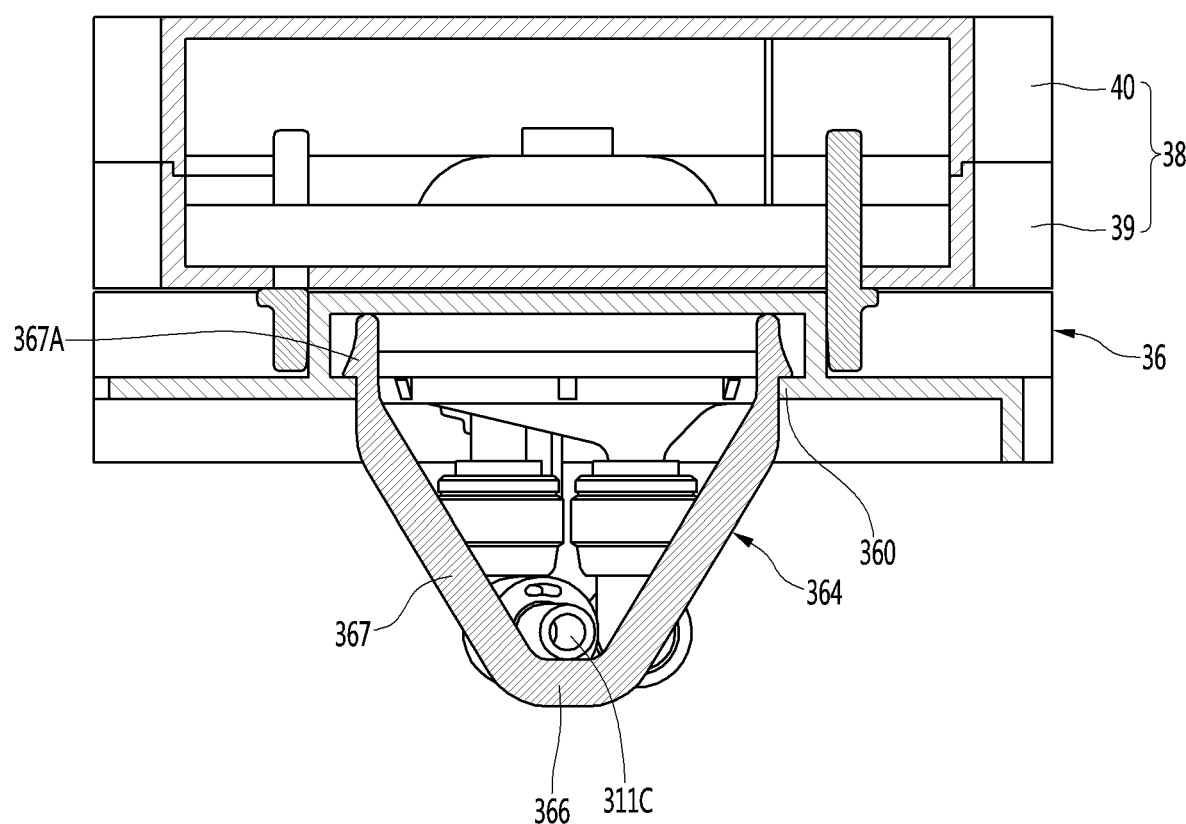
FIG. 13 is a view illustrating an example configuration of an example support holder.

FIG. 12 is a bottom view illustrating an example ingredient supplier, and FIG. 13 is a view illustrating an example configuration of an example support holder.

Hereinafter, details of the connection channels 311 and 312 and support holders 364 and 365 of FIGS. 12 and 13 will be described with reference to FIGS. 8 to 11. Also, a first support holder 364 is illustrated in FIG. 13. As a result, a person skilled in the art may easily understand the configuration of a second support holder 365 as well.

As described above, the connection channels 311 and 312 may connect the inlet of one container mounting part of the plurality of container mounting parts 31, 32, and 33 to the outlet of the other container mounting part. In more detail, a first connection channel 311 may connect the outlet 31B of the initial ingredient holder 31 to the inlet 32A of the intermediate ingredient holder 32, and the second connection channel 312 may connect the outlet 32B of the intermediate accommodating part 32 to the inlet 33A of the final ingredient holder 33.

The inlets 31A, 32A, and 33A and the outlet 31B, 32B, and 33B of the ingredient holders 31, 32, and 33 may be protrude from the ingredient holders 31, 32, and 33 in the same direction, more particularly, in the downward direction. Thus, the inlet of the one ingredient holder and the outlet of the other ingredient holder may be easily connected to each other by the connection channels 311 and 312.

The beverage maker may further include support holders 364 and 365 provided in the ingredient supplier 3 to support the connection channels 311 and 312. The support holders 364 and 365 may be provided in the ingredient accommodating body 36 to support and fix the connection channels 311 and 312.

At least one support holder 364 and 365 may be provided. The number of support holders 364 and 365 may be the same as that of connection channels 311 and 312. For example, the beverage maker may include a first support holder 364 supporting the first connection channel 311 and a second support holder 365 supporting the second connection channel 312.

The support holders 364 and 365 may overlap between the one ingredient holder and the other ingredient holder in the vertical direction. In more detail, the first support holder 364 may overlap between the initial ingredient holder 31 and the intermediate accommodating part 32 in the vertical direction, and the second support holder 365 may overlap between the intermediate ingredient holder 32 and the final ingredient holder 33 in the vertical direction.

The connection channels 311 and 312 may include outlet fittings 311A and 312A, inlet fittings 311B and 312B, and hose parts 311C and 312C.

The outlet fittings 311A and 312A may be mounted on the outlet of one ingredient holder, the inlet fittings 311B and 312B may be mounted on the inlet of the other ingredient holder, and the hose parts 311C and 32C may connect to the outlet fittings 311A and 312A to the inlet fittings 311B and the 312B.

In more detail, the outlet fitting 311A of the first connection channel 311 may be mounted on the outlet 31B of the initial ingredient holder 31, and the inlet fitting 311B may be mounted on the inlet 32A of the intermediate ingredient holder 32. Also, the outlet fitting 312A of the second connection channel 312 may be mounted on the outlet 32B of the intermediate ingredient holder 32, and the inlet fitting 312B may be mounted on the inlet 33A of the final ingredient holder 33.

Each of the outlet fittings 311A and 312A and the inlet fittings 311B and 312B may have an L shape. That is, the outlet fittings 311A and 312A may include a vertical part connected to the outlets 31B and 32B of the ingredient holder and a horizontal part connected to one end of the hose part 311C and 312C. Also, the inlet fittings 311B and 312B may include a vertical part connected to the inlets 32A and 33A of the ingredient holder and a horizontal part connected to the other end of the hose part 311C and 312C.

Each of the outlet fittings 311A and 312A may allow the outlet of the one ingredient holder to communicate with one end of each of the hose parts 311C and 312C, and each of the inlet fittings 311B and 312B may allow the inlet of the other ingredient holder to communicate with the other end of each of the hose part 311C and 312C.

Each of the hose parts 311C and 312C may have a straight pipe shape and be horizontally disposed The support holders 364 and 365 may support at least one of the outlet fittings 311A and 312A, the inlet fittings 311B and 312B, or the hose parts 311C and 312C.

The support holders 364 and 365 may include a support part 366 supporting a lower portion of each of the connection channels 311 and 312, and a pair of extension parts 367 respectively extending from both ends of the support part 366 and coupled to the ingredient accommodating body 36.

A hook part 367A may be disposed on an end of each of the pair of extension parts 367. The hook part 367A may be caught with a hook catching part 360 disposed on the ingredient accommodating body 36. Thus, the support holder 364 may be coupled to the ingredient accommodating body 36.

The hook catching part 360 disposed on the ingredient accommodating body 36 may be integrated with the ingredient accommodating body 36 or may be provided as a separate bracket installed on the ingredient accommodating body 36.

Also, a distance between the pair of extension parts 367 may increase as the pair of extension parts 367 are closer to the ingredient accommodating body 36. Thus, the support holders 364 and 365 may more stably support the connection channels 311 and 312. Also, the hook coupling may be more firmly realized by elastic force of the support holders 364 and 365 itself.

As described above, the plurality of ingredient holders 31, 32, and 33 may be disposed in a line. Here, the inlets 31A, 32A, and 33A and the outlets 31B, 32B, and 33B of the plurality of ingredient holders 31, 32, and 33 may be disposed in a straight line X1.

Also, the inlets 31A, 32A, and 33A and the outlets 31B, 32B, and 33B of the plurality of ingredient holders 31, 32, and 33 may be alternately disposed with respect to each other. Thus, a longitudinal direction of the connection channels 311 and 312 may be parallel to the straight line X1.

A horizontal distance between the outlet of the one ingredient holder and the inlet of the other ingredient holder may be minimized due to the above-described constituents. Thus, each of the connection channels 311 and 312 may decrease in length.

As described above, an ingredient supply valve 310 for opening and closing the first main channel 41 may be installed in the first main channel (see reference numeral 41 of FIG. 1) connected to the inlet 31A of the initial ingredient holder 31. An ingredient supply valve mounting part 310A on which the ingredient supply valve 310 is mounted may be disposed on the ingredient accommodating body 36. The ingredient supply valve mounting part 310A may be disposed on the bottom surface of the ingredient accommodating body 36 and be installed adjacent to the inlet 31A of the initial ingredient holder 31.

Figure 14:
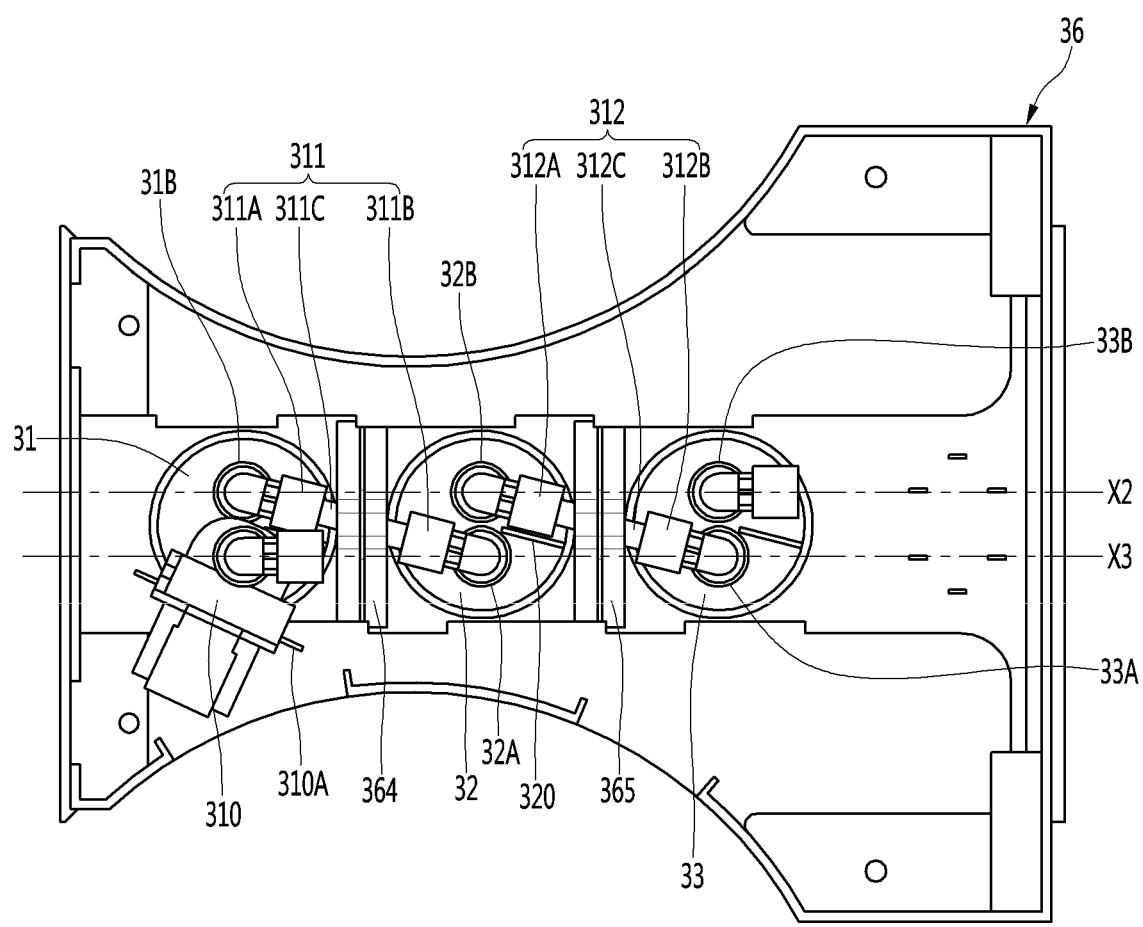
FIG. 14 is a bottom view illustrating an example ingredient supplier.
Figure 15:
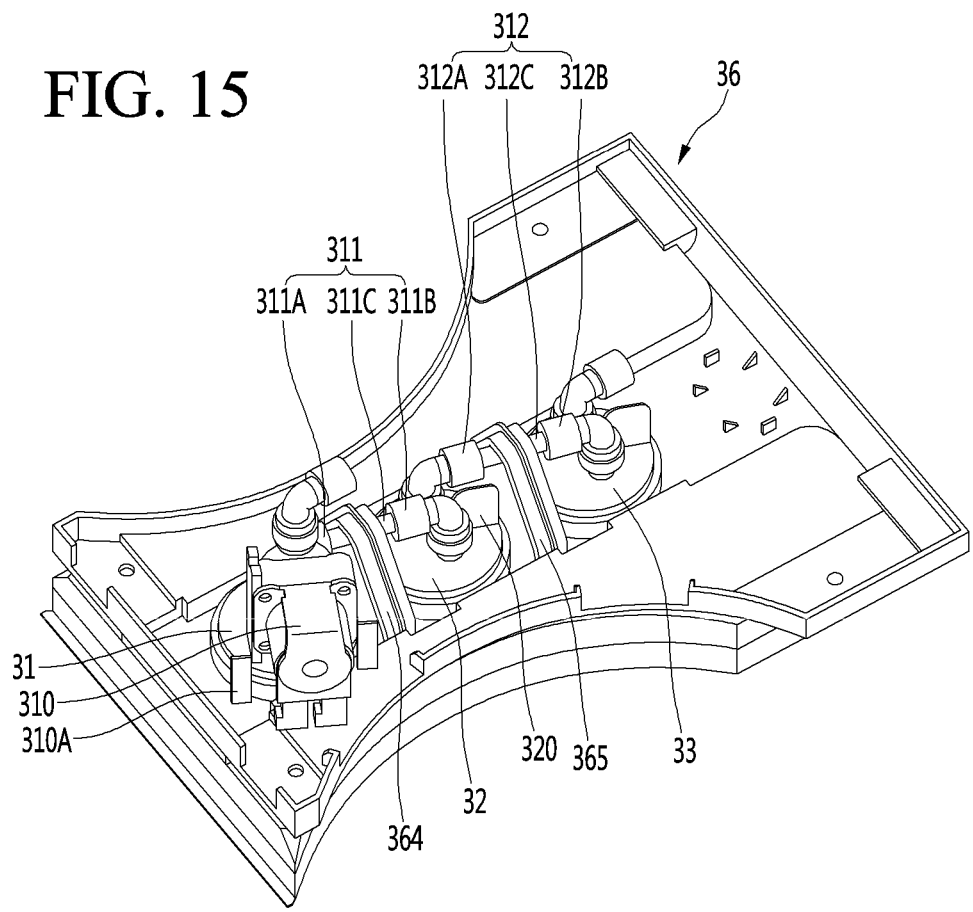
FIG. 15 is a bottom perspective view of the ingredient supplier of FIG. 14.

FIG. 14 is a bottom view illustrating an example ingredient supplier, and FIG. 15 is a bottom perspective view of the ingredient supplier of FIG. 14.

The order of the plurality of ingredient holders 31, 32 and 33 in the front and rear direction in FIGS. 14 and 15 is shown opposite to that of the plurality of ingredient holders 31, 32, and 33 in FIGS. 6 to 12. However, as described above, it should be noted that the arrangement of the plurality of ingredient holders 31, 32, and 33 may be changed as necessary, so that this is not related to the spirit of the present disclosure and is for the sake of understanding.

Hereinafter, contents duplicated with the foregoing implementation will be omitted, and differences will be mainly described.

In some implementations, an ingredient supplier includes: outlets 31B, 32B, and 33B of a plurality of ingredient holders 31, 32, and 33, respectively, that are disposed in one straight line X2; and inlets 31A, 32A, and 33A of the plurality of ingredient holders 31, 32, and 33, respectively, that are disposed in the other straight line X3 parallel to the one straight line X2. In some examples, the one straight line X2 and the other straight line X3 may be parallel to a direction in which the plurality of ingredient holders 31, 32, and 33 are disposed in a line.

For example, as illustrated in FIG. 14, the plurality of ingredient holders 31, 32, and 33 may be disposed in a line in the front and rear direction, and the inlet 31A, 32A, and 33A and the outlet 31B, 32B, and 33B of the ingredient holders 31, 32, and 33 may be disposed to be spaced part from each other in a left and right direction.

Since the connection channels 311 and 312 connect the outlets 31B and 32B disposed on one straight line X2 to the inlets 32A and 33A disposed on the other straight line X3, a longitudinal direction of the connection channels 311 and 312 may not be parallel to the one straight line X2 and the other straight line X3.

A guide plate 320 lengthily disposed in a direction parallel to the connection channels 311 and 312 may be provided on an outer bottom surface of each of the ingredient holders 31, 32, and 33. The guide plate 320 may protrude downward from the outer bottom surface of each of the ingredient holders 31, 32, and 33.

In more detail, the guide plate 320 may be lengthily disposed in a direction parallel to the longitudinal direction of hose parts 311C and 312C of the connection channels 311 and 312.

Also, the guide plate 320 may be disposed to face between the inlets 31A, 32A, and 33A and the outlets 31B, 32B, and 33B of the ingredient holders 31, 32, and 33. That is, the guide plate 320 may overlap between the inlets 31A, 32A, and 33A and the outlets 31B, 32B, and 33B of the ingredient holders 31, 32, and 33 in the longitudinal direction of the hose parts 311C and 312C.

Also, at least a portion of the guide plate 320 may overlap the inlets 31A, 32A, and 33A of the ingredient holders 31, 32, and 33 in a direction parallel to the one straight line X2 and the other straight line X3. That is, at least a portion of the guide plate 320 may be disposed between the inlet of one ingredient holder and the inlet of the other ingredient holder.

Since the connection channels 311 and 312 do not connect the inlets of the ingredient holders different from each other to each other due to the above-described constituents, erroneous connection due to the confusion of the inlets 31A, 32A and 33A and the outlets 31B, 32B and 33B of the ingredient holders 31, 32, and 33 may be prevented.

According to the implementations, the plurality of ingredient holders may be connected to each other in series rather than in parallel, the components and channels of the ingredient supplier may be simplified. Thus, the manufacturing costs may be reduced, and the beverage maker may be compact.

Also, since the plurality of ingredient holders are connected to each other in series rather than in parallel, the number of connecting portions connecting the constituents to each other may be reduced. The number of leaking points may be minimized to improve the reliability of the beverage maker.

Since the plurality of ingredient holders are connected to each other in series rather than in parallel, the amount of water passing through each of the ingredient holders may increase so that the ingredients contained in the ingredient holder may be more easily dispensed.

Since the plurality of ingredient holders are connected to each other in series rather than in parallel, the number of check valves that are necessary to prevent the fluid from flowing back to the ingredient holders may be reduced to reduce the manufacturing cost.

Also, when the plurality of ingredient holders are connected in series rather than in parallel, the user may do not have to worry about the order of mounting the capsules, and thus the malfunctions caused by mounting the capsules in the wrong order may not occur.

Also, the connection channels are fixed by the support holder, the separation and vibration of the connection channels may be prevented.

Also, the support holder may be simply mounted on the ingredient accommodating body by the hook part of the support holder.

Also, the erroneous connection of the connection channels by the worker may be prevented by the guide plate.

The above-disclosed subject matter is to be considered illustrative, and not restrictive, and the appended claims are intended to cover all such modifications, enhancements, and other implementations, which fall within the true spirit and scope of the present disclosure.

Thus, the implementation of the present disclosure is to be considered illustrative, and not restrictive, and the technical spirit of the present disclosure is not limited to the foregoing implementation.

Therefore, the scope of the present disclosure may be defined not only by the detailed description but also by the appended claims, and all differences within the scope will be construed as being included in the present disclosure.

What is claimed is:

1. A beverage maker comprising:
    a water supply module configured to supply water used by the beverage maker;
    an ingredient supplier connected to the water supply module, the ingredient supplier comprising a plurality of ingredient holders, each ingredient holder having an inlet and an outlet;
    a fermentation module connected to the ingredient supplier and configured to receive ingredients from the ingredient supplier and water from the water supply module;
    at least one connection channel configured to connect the outlet of a first ingredient holder among the plurality of the ingredient holders to the inlet of a second ingredient holder among the plurality of the ingredient holders; and
    a support holder located in the ingredient supplier and configured to support the connection channel.

2. The beverage maker according to claim 1, wherein the plurality of ingredient holders are spaced apart from each other, and
    wherein the support holder is located at a position between the first ingredient holder and the second ingredient holder, and extends in a vertical direction.

3. The beverage maker according to claim 1, wherein the inlet and the outlet of each ingredient holder protrude from the ingredient holder in a same direction.

4. The beverage maker according to claim 1, wherein the connection channel comprises:
    an outlet fitting configured to couple to the outlet of the first ingredient holder;
    an inlet fitting configured to couple to the inlet of the second ingredient holder; and
    a hose part that connects the outlet fitting to the inlet fitting, and
    wherein the support holder is configured to support at least one of the outlet fitting, the inlet fitting, or the hose part.

5. The beverage maker according to claim 4, wherein the outlets of the plurality of ingredient holders are arranged along a first straight line that passes through the plurality of ingredient holders, and
    wherein the inlets of the plurality of ingredient holders are arranged along a second straight line that is parallel to the first straight line and that passes through the plurality of ingredient holders.

6. The beverage maker according to claim 5, wherein the ingredient supplier further comprises a guide plate that is located at an outer bottom surface of each ingredient holder and that extends in a direction parallel to a longitudinal direction of the hose part of the connection channel.

7. The beverage maker according to claim 6, wherein the guide plate is located between the inlet and outlet of each ingredient holder.

8. The beverage maker according to claim 6, wherein at least a portion of the guide plate is disposed between the inlet of the first ingredient holder and the inlet of the second ingredient holder.

9. The beverage maker according to claim 1, wherein the ingredient supplier comprises:
    an ingredient accommodating body that includes the plurality of ingredient holders and the support holder; and
    a lid module configured to open and close at least a portion of the plurality of ingredient holders.

10. The beverage maker according to claim 9, wherein the support holder comprises:
    a support part configured to support a lower portion of the connection channel; and
    a pair of extension parts that extend from each of both ends of the support part and that are configured to couple to the ingredient accommodating body.

11. The beverage maker according to claim 10, wherein each of the pair of extension parts comprises a hook part located at an end of each of the pair of extension parts, and
    wherein the ingredient accommodating body comprises a hook catching part configured to couple to the hook part.

12. The beverage maker according to claim 10, wherein a distance between the pair of extension parts at the ingredient accommodating body is greater than a distance between the pair of extension parts at the lower portion of the connection channel.

13. The beverage maker according to claim 1, wherein the inlets and the outlets of the plurality of ingredient holders are arranged along a straight line that passes through the plurality of ingredient holders.

14. The beverage maker according to claim 13, wherein the inlets and the outlets of the plurality of ingredient holders are alternately disposed along the straight line.

15. The beverage maker according to claim 1, further comprising:
  a main channel that connects the water supply module to the ingredient supplier; and
  an ingredient supply valve configured to open and close at least a portion of the main channel,
  wherein the ingredient supplier defines an ingredient supply valve mounting part configured to mount the ingredient supply valve.

16. A beverage maker comprising:
  a water supply module configured to supply water used by the beverage maker;
  an ingredient supplier connected to the water supply module through a first main channel, the ingredient supplier comprising a plurality of ingredient holders, each ingredient holder having an inlet and an outlet; and
  a fermentation module connected to the ingredient supplier through a second main channel and configured to receive ingredients from the ingredient supplier and water from the water supply module,
  wherein the plurality of ingredient holders are connected in series to each other to enable fluid to pass through the plurality of ingredient holders in series.

17. The beverage maker according to claim 16, further comprising one or more connection channels configured to connect the outlet of one ingredient holder to the inlet of anther ingredient holder among the plurality of the ingredient holders,
  wherein the plurality of ingredient holders comprise:
    an initial ingredient holder comprising an initial inlet connected to the first main channel;
    a final ingredient holder comprising a final outlet connected to the second main channel; and
    at least one intermediate ingredient holder disposed between the initial ingredient holder and the final ingredient holder, the intermediate ingredient holder comprising an inlet and an outlet that are connected to different connection channels among the one or more connection channels.

18. The beverage maker according to claim 17, further comprising a support holder configured to support the one or more connection channels,
  wherein the ingredient supplier comprises:
    an ingredient accommodating body that includes the plurality of ingredient holders and the support holder; and
    a lid module configured to open and close at least a portion of the plurality of ingredient holders.

19. The beverage maker according to claim 17, wherein the plurality of ingredient holders are located vertically above the one or more connection channels.

20. The beverage maker according to claim 16, wherein the inlet of one ingredient holder is configured to receive fluid from the outlet of another ingredient holder.

* * * * *